United States Patent
Endo et al.

(10) Patent No.: US 12,289,515 B2
(45) Date of Patent: Apr. 29, 2025

(54) VEHICLE-MOUNTED SENSING SYSTEM AND GATED CAMERA

(71) Applicants: KOITO MANUFACTURING CO., LTD., Tokyo (JP); BRIGHTWAY VISION LTD., Tirat Hacarmel (IL)

(72) Inventors: Yoshihisa Endo, Shizuoka (JP); Jun Kano, Shizuoka (JP); Manabu Kato, Shizuoka (JP); Yuichi Watano, Shizuoka (JP)

(73) Assignees: KOITO MANUFACTURING CO., LTD., Tokyo (JP); BRIGHTWAY VISION LTD., Tirat Hacarmel (IL)

(*) Notice: Subject to any disclaimer, the term of this patent is extended or adjusted under 35 U.S.C. 154(b) by 75 days.

(21) Appl. No.: 18/042,357

(22) PCT Filed: Aug. 19, 2021

(86) PCT No.: PCT/JP2021/030394
§ 371 (c)(1),
(2) Date: Feb. 21, 2023

(87) PCT Pub. No.: WO2022/039230
PCT Pub. Date: Feb. 24, 2022

(65) Prior Publication Data
US 2023/0328353 A1    Oct. 12, 2023

(30) Foreign Application Priority Data

Aug. 21, 2020  (JP) ................................. 2020-140274
Aug. 21, 2020  (JP) ................................. 2020-140275

(51) Int. Cl.
*H04N 23/60*  (2023.01)
*G03B 7/16*   (2021.01)
(Continued)

(52) U.S. Cl.
CPC ............. *H04N 23/60* (2023.01); *G03B 15/03* (2013.01); *H04N 23/56* (2023.01); *H04N 23/958* (2023.01)

(58) Field of Classification Search
CPC ...... H04N 23/60; H04N 23/958; H04N 23/56; H04N 23/651; H04N 23/667; H04N 23/73;
(Continued)

(56) References Cited

U.S. PATENT DOCUMENTS 12,135,394 B2 * 11/2024 Kato ...................... G01S 17/894
2007/0058038 A1 * 3/2007 David .................... G01S 7/483
348/135

(Continued)

FOREIGN PATENT DOCUMENTS

EP     3 396 410 A1    10/2018
JP     2004-15233 A    1/2004
(Continued)

OTHER PUBLICATIONS

T. Gruber et al., 2019 Proc. of IEEE/CVF International Conference on Computer Vision, Seoul, South Korea, Oct. 27 to Nov. 2, 2019, p. 1506-1516—Gated2Depth: Real-Time Dense Lidar from Gated Images—year 2019.*
(Continued)

*Primary Examiner* — Marly S Camargo
(74) *Attorney, Agent, or Firm* — Sughrue Mion, PLLC

(57) ABSTRACT

A gated camera for dividing a field of view into a plurality of ranges in a depth direction and generating a plurality of slice images corresponding to the plurality of ranges, the gated camera includes: an illumination device configured to irradiate the field of view with pulse illumination light; an image sensor; and a camera controller configured to control a light emission timing of the illumination device and an exposure timing of the image sensor. The camera controller is configured to switch between a first imaging mode in which performance is relatively high and power consumption is relatively high, and a second imaging mode in which
(Continued)

performance is relatively low and power consumption is relatively low.

8 Claims, 22 Drawing Sheets

(51) Int. Cl.
| | | |
|---|---|---|
| G03B 15/03 | (2021.01) | |
| G03B 15/05 | (2021.01) | |
| G03B 15/06 | (2021.01) | |
| H04N 23/56 | (2023.01) | |
| H04N 23/58 | (2023.01) | |
| H04N 23/65 | (2023.01) | |
| H04N 23/667 | (2023.01) | |
| H04N 23/73 | (2023.01) | |
| H04N 23/958 | (2023.01) | |

(58) Field of Classification Search
CPC ........ H04N 23/74; H04N 23/95; G03B 15/06; G03B 15/05; G03B 7/00; G03B 7/16
See application file for complete search history.

(56) References Cited

U.S. PATENT DOCUMENTS

| | | | | |
|---|---|---|---|---|
| 2012/0320219 A1* | 12/2012 | David | ................... | G01S 17/89 |
| | | | | 348/169 |
| 2014/0240462 A1* | 8/2014 | Felzenshtein | ........ | H04N 13/204 |
| | | | | 348/46 |
| 2015/0160340 A1 | 6/2015 | Grauer et al. | | |
| 2016/0344965 A1* | 11/2016 | Grauer | ................. | H04N 25/587 |
| 2019/0004149 A1 | 1/2019 | Mano et al. | | |
| 2019/0025406 A1 | 1/2019 | Krelboim et al. | | |
| 2019/0056498 A1 | 2/2019 | Sonn et al. | | |
| 2021/0103201 A1* | 4/2021 | Gluskin | ................. | H04N 23/71 |
| 2021/0295065 A1* | 9/2021 | Arai | ........................ | G01S 17/18 |

FOREIGN PATENT DOCUMENTS

| | | |
|---|---|---|
| JP | 2009-257983 A | 11/2009 |
| JP | 2015-527761 A | 9/2015 |
| WO | 2017/110413 A1 | 6/2017 |
| WO | 2017/149370 A1 | 9/2017 |
| WO | 2020/121973 A1 | 6/2020 |

OTHER PUBLICATIONS

Extended European Search Report issued Jan. 4, 2024 by the European Patent Office in European Patent Application No. 21858374.8.

International Search Report (PCT/ISA/210) dated Nov. 16, 2021, issued by the International Searching Authority in counterpart International Application No. PCT/JP2021/030394.

Written Opinion (PCT/ISA/237) dated Nov. 16, 2021, issued by the International Searching Authority in counterpart International Application No. PCT/JP2021/030394.

Communication issued on Feb. 4, 2025 from the Japan Patent Office for Japanese Patent Application No. 2022-543997.

* cited by examiner

FREQUENCY

GRAY SCALE

IMGfx

IMGfy

IMGd

VEHICLE-MOUNTED SENSING SYSTEM AND GATED CAMERA

CROSS-REFERENCE TO RELATED APPLICATIONS

This application is a National Phase Entry of PCT International Application No. PCT/JP2021/030394 filed on Aug. 19, 2021, which claims priority to Japanese Patent Application No. 2020-140274 filed on Aug. 21, 2020, and Japanese Patent Application No. 2020-140275 filed on Aug. 21, 2020, the contents of all of which are incorporated herein by reference in their entirety.

TECHNICAL FIELD

The present invention relates to a sensing system for a vehicle.

BACKGROUND ART

For driving assistance or autonomous driving, an object identification system that senses a position and a type of an object present around a vehicle is used. The object identification system includes a sensor and an arithmetic processing device that analyzes an output from the sensor. The sensor is selected from a camera, light detection and ranging or laser imaging detection and ranging (LiDAR), a millimeter wave radar, an ultrasonic sonar, an active sensor, and the like in consideration of use, required accuracy, and cost.

CITATION LIST

Patent Literature

Patent Literature 1: JP2009-257983A
Patent Literature 2: WO2017/110413A1

SUMMARY OF INVENTION

Technical Problem

As an active sensor in place of a TOF camera, a gated camera or a gating camera has been proposed (Patent Literatures 1 and 2). The gated camera divides an imaging range into a plurality of ranges, and performs imaging by changing an exposure timing and an exposure time for each range. As a result, a slice image is obtained for each target range, and each slice image includes only an object included in the corresponding range.

Since the gated camera is the active sensor and both an image sensor and an illumination device consume power, the gated camera has power consumption higher than that of a general monocular camera or stereo camera.

The present invention has been made in such a situation, and an exemplary object of an aspect of the present invention is to provide a gated camera whose power consumption is reduced.

Solution to Problem

1. A gated camera according to an embodiment divides a field of view into a plurality of ranges in a depth direction and generates a plurality of slice images corresponding to the plurality of ranges. The gated camera includes an illumination device configured to irradiate the field of view with pulse illumination light, an image sensor, and a camera controller configured to control a light emission timing of the illumination device and an exposure timing of the image sensor. The camera controller is configured to determine an operation state/stop state of the gated camera and/or an imaging mode of the gated camera.

A sensing system according to an embodiment is used for driving assistance or autonomous driving. The sensing system includes: a main sensor; a gated camera configured to switch between a first imaging mode in which performance is relatively high and power consumption is relatively high, and a second imaging mode in which performance is relatively low and power consumption is relatively low, and divide a field of view into a plurality of ranges in a depth direction and generate a plurality of slice images corresponding to the plurality of ranges; and a main controller configured to process an output from the main sensor and an output from the gated camera. The gated camera is configured to determine an operation state/stop state and/or an imaging mode of the gated camera itself based on at least one of at least one vehicle signal and the slice images captured by the gated camera itself.

2. A gated camera according to an embodiment divides a field of view into a plurality of ranges in a depth direction and generates a plurality of slice images corresponding to the plurality of ranges. The gated camera includes an illumination device configured to irradiate the field of view with pulse illumination light, an image sensor, and a camera controller configured to control a light emission timing of the illumination device and an exposure timing of the image sensor. The camera controller is configured to switch between a first imaging mode in which performance is relatively high and power consumption is relatively high, and a second imaging mode in which performance is relatively low and power consumption is relatively low.

A sensing system according to an embodiment is used for driving assistance or autonomous driving. The sensing system includes: a main sensor; a gated camera configured to switch between a first imaging mode in which performance is relatively high and power consumption is relatively high, and a second imaging mode in which performance is relatively low and power consumption is relatively low, and divide a field of view into a plurality of ranges in a depth direction and generate a plurality of slice images corresponding to the plurality of ranges; and a main controller configured to process an output from the main sensor and an output from the gated camera.

Advantageous Effects of Invention

According to the present invention, power consumption of a gated camera can be reduced.

DESCRIPTION OF EMBODIMENTS

Figure 1:
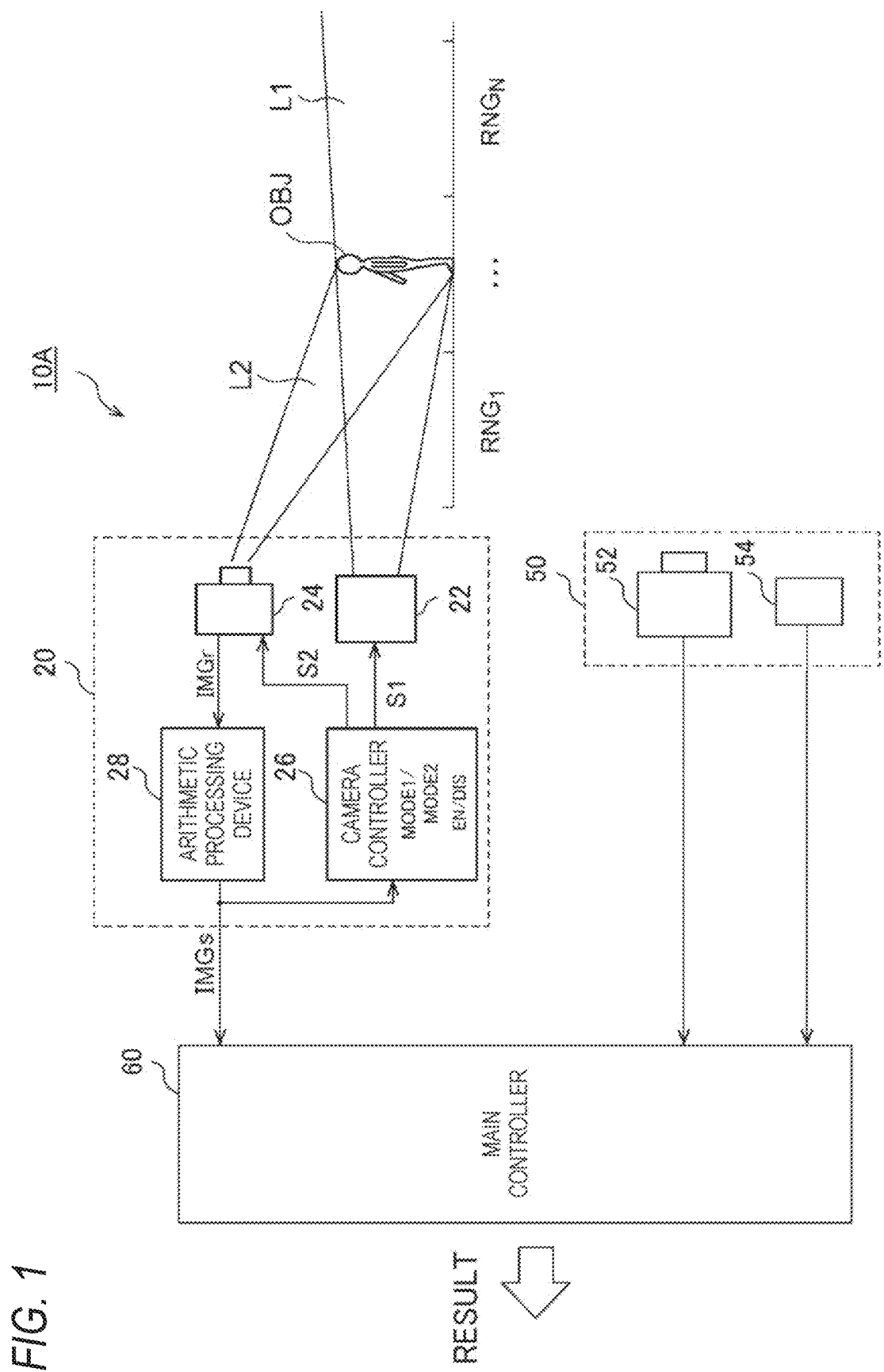
FIG. 1 is a block diagram of a sensing system according to a first embodiment.

An overview of some exemplary embodiments of the present invention will be described. As an introduction of the detailed description to be described later, this overview is intended to simplify and describe some concepts of one or more embodiments for the purpose of basic understanding of the embodiments, and is not intended to limit the scope of the invention or disclosure. In addition, this overview is not a comprehensive overview of all conceivable embodiments, and is not intended to limit components that are essential for the embodiments. For convenience, "an embodiment" may be used to refer to one embodiment (example or modification) or a plurality of embodiments (example or modification) disclosed in the present description.

A gated camera according to an embodiment divides a field of view into a plurality of ranges in a depth direction and generates a plurality of slice images corresponding to the plurality of ranges. The gated camera includes an illumination device configured to irradiate the field of view with pulse illumination light, an image sensor, and a camera controller configured to control a light emission timing of the illumination device and an exposure timing of the image sensor. The camera controller is configured to switch between a first imaging mode in which performance is relatively high and power consumption is relatively high, and a second imaging mode in which performance is relatively low and power consumption is relatively low.

The gated camera can switch between a mode in which performance is high and power consumption is high, and a mode in which performance is lowered and power consumption is reduced, and the mode is dynamically selected according to a traveling environment. By adaptively lowering the performance instead of always operating at high performance, the power consumption can be reduced in return for the performance.

In an embodiment, the first imaging mode and the second imaging mode may be different from each other in frame rate. By reducing the frame rate, the power consumption can be reduced.

In an embodiment, the first imaging mode and the second imaging mode may be different from each other in the number of ranges to be measured. By reducing the number of ranges, the power consumption can be reduced.

In an embodiment, the first imaging mode and the second imaging mode may be different from each other in distance to a far side boundary of a farthest range (farthest imaging distance). In this case, the first imaging mode and the second imaging mode may be different from each other in intensity of the pulse illumination light. When the farthest imaging distance is shortened, the power consumption can be reduced by lowering the intensity of the pulse illumination light. Further, an amount of heat generated by the illumination device can be reduced.

In an embodiment, the gated camera may immediately switch, in response to an instruction from a main controller, to a standby mode in which imaging is executable.

In an embodiment, the camera controller may select an imaging mode based on at least one vehicle signal. Examples of the vehicle signal include an output from a rain sensor, an output from a fog sensor, vehicle speed information, a fail signal indicating malfunction of a main sensor, a fail signal indicating malfunction of a main controller or a decrease in accuracy of recognition performed by the main controller, a control signal of a wiper, a control signal of a fog lamp, and the like.

In an embodiment, the camera controller may select an imaging mode based on the slice images. Based on the slice images, whether weather, that is, visibility is good or bad may be determined, and a determination result may be reflected in mode selection.

In an embodiment, an imaging mode of the camera controller may be selected by a main controller or may be selected according to a state of the main controller. For example, the imaging mode may be switched according to accuracy of a main sensor input to the main controller, accuracy of recognition when the main controller performs object recognition, fail information of the main controller, and the like.

A gated camera according to an embodiment divides a field of view into a plurality of ranges in a depth direction and generates a plurality of slice images corresponding to the plurality of ranges. The gated camera includes an illumination device configured to irradiate the field of view with pulse illumination light, an image sensor, and a camera controller configured to control a light emission timing of the illumination device and an exposure timing of the image sensor. The camera controller is configured to determine an operation state/stop state of the gated camera and/or an imaging mode of the gated camera.

The gated camera can switch between the operation state and the stop state, or can switch the imaging mode. The gated camera autonomously controls the operation state of the gated camera itself. As a result, the power consumption can be reduced by selecting an imaging mode in which performance is low or stopping imaging according to a current traveling environment without applying an unnecessary load to a host controller on a vehicle side.

In an embodiment, the camera controller may determine the operation state/stop state of the gated camera and/or the imaging mode of the gated camera based on the slice images. A subject included in a specific range in the depth direction of the field of view is imaged in the slice image generated by the gated camera. By using the property, it is possible to estimate weather and whether visibility is good or bad, and to use an estimation result for control of the gated camera.

In an embodiment, the camera controller may switch between a first imaging mode in which performance is relatively high and power consumption is relatively high, and a second imaging mode in which performance is relatively low and power consumption is relatively low. The gated camera can switch between a mode in which performance is high and power consumption is high, and a mode in which performance is lowered and power consumption is reduced, and the mode is dynamically selected according to the traveling environment. By adaptively lowering the performance instead of always operating at high performance, the power consumption can be reduced in return for the performance.

In an embodiment, the operation state/stop state of the gated camera may be externally controlled. The camera controller may control the imaging mode based on the slice images.

In an embodiment, the camera controller may control the operation state/stop state and the imaging mode of the gated camera based on the slice images.

In an embodiment, the gated camera may constantly operate. The camera controller may control the imaging mode of the gated camera based on the slice images.

In an embodiment, the gated camera may not support switching of the imaging mode. The camera controller may control the operation state/stop state of the gated camera based on the slice images.

In an embodiment, the camera controller may intermittently perform, instead of normal imaging, imaging for controlling a state of the camera controller itself (that is, the operation state/stop state and/or the imaging mode of the gated camera).

A sensing system according to an embodiment is used for driving assistance or autonomous driving. The sensing system includes: a main sensor; a gated camera configured to switch between a first imaging mode in which performance is relatively high and power consumption is relatively high, and a second imaging mode in which performance is relatively low and power consumption is relatively low, and divide a field of view into a plurality of ranges in a depth direction and generate a plurality of slice images corresponding to the plurality of ranges; and a main controller configured to process an output from the main sensor and an output from the gated camera. The gated camera is configured to determine an operation state/stop state and/or an imaging mode of the gated camera itself based on at least one of at least one vehicle signal and the slice images captured by the gated camera itself.

In an embodiment, the gated camera may determine the operation state/stop state of the gated camera itself based on the slice images captured by the gated camera itself.

In an embodiment, the gated camera may determine the operation state/stop state of the gated camera itself based on the vehicle signal.

In an embodiment, the operation state/stop state of the gated camera may be controlled by the main controller.

EMBODIMENTS

Hereinafter, preferred embodiments will be described with reference to the drawings. The same or equivalent components, members, and processing shown in the drawings are denoted by the same reference numerals, and repeated description thereof will be omitted as appropriate. The embodiments are not intended to limit the scope of the present invention and invention and are merely used for description, and all features described in the embodiments and combinations thereof are not necessarily essential features of the present disclosure and invention.

First Embodiment

FIG. 1 is a block diagram of a sensing system 10A according to a first embodiment. The sensing system 10A is mounted on a vehicle such as an automobile or a motorcycle for driving assistance or autonomous driving, and detects an object OBJ present around the vehicle.

The sensing system 10A includes a main sensor group 50, a main controller 60, and a gated camera 20. The main sensor group 50 may include one or more sensors. For example, the main sensor group 50 includes a camera 52 and a millimeter wave radar 54. Alternatively, the main sensor group 50 may include a stereo camera. Alternatively, the main sensor group 50 may include a LiDAR or the like.

The main controller 60 detects a position and a type of an object around the vehicle based on an output from the main sensor group 50, and outputs a detection result RESULT. For example, the main controller 60 may include an identifier (classifier), and the detection result RESULT may include information on a type (category or class) and a position of a target object.

The gated camera 20 divides a field of view into a plurality of ranges $RNG_1$ to $RNG_N$ in a depth direction, and generates a plurality of slice images $IMGs_1$ to $IMGs_N$ corresponding to the plurality of ranges $RNG_1$ to $RNG_N$. Adjacent ranges may overlap with each other in the depth direction at boundaries of the ranges.

The gated camera 20 includes an illumination device 22, an image sensor 24, a camera controller 26, and an arithmetic processing device 28.

The illumination device (light projector) 22 irradiates a front of the vehicle with pulse illumination light L1 in synchronization with a light emission timing signal S1 supplied from the camera controller 26. The pulse illumination light L1 is preferably infrared light, but is not limited thereto, and may be visible light having a predetermined wavelength. As the illumination device 22, for example, a laser diode (LD) or an LED may be used. In a system in which the gated camera 20 is used only at night, a wavelength of the pulse illumination light L1 may be a near infrared wavelength near 800 nm. In a system in which the gated camera 20 is used all day and all night, the pulse illumination light L1 may have a wavelength range longer than 1 µm.

The image sensor 24 includes a plurality of pixels, can perform exposure control in synchronization with an exposure timing signal S2 supplied from the camera controller 26, and generates a slice image IMGr including a plurality of pixels. The image sensor 24 has sensitivity to the same wavelength as that of the pulse illumination light L1, and images reflective light (return light) L2 reflected by the object OBJ. The slice image IMGr generated by the image sensor 24 for an i-th range $RNG_i$ is referred to as a raw image or a primary image as necessary, and is distinguished from a slice image IMGs which is a final output from the gated camera 20. The raw image IMGr and the slice image IMGs are also simply and collectively referred to as a slice image IMG.

The camera controller 26 changes the light emission timing signal S1 and the exposure timing signal S2 for each range RNG to change a time difference between light emission performed by the illumination device 22 and exposure of the image sensor 24. The light emission timing signal S1 defines a timing of starting light emission and a light emission time. The exposure timing signal S2 defines a timing of starting exposure (a time difference from the light emission) and an exposure time.

The arithmetic processing device 28 can be implemented by a combination of a processor (hardware) such as a central processing unit (CPU), a micro processing unit (MPU), a microcomputer, or a graphics processing unit (GPU), and a software program executed by the processor (hardware). The arithmetic processing device 28 may be implemented by only hardware. The arithmetic processing device 28 processes raw image data IMGr generated by the image sensor 24 and outputs the final slice image IMGs. When an output IMGr from the image sensor 24 is directly used as the slice image IMGs, the arithmetic processing device 28 can be omitted.

Figure 2:
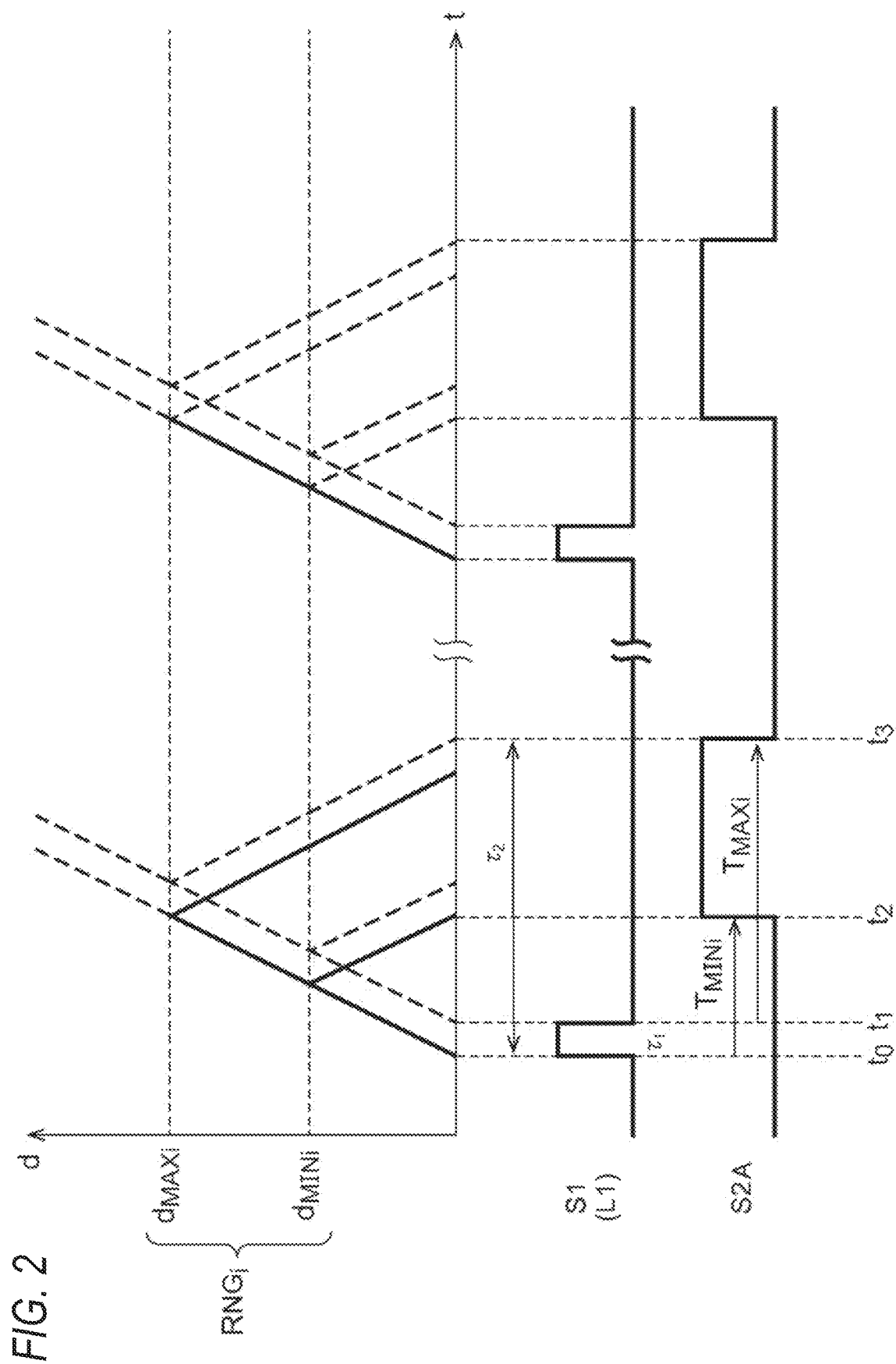
FIG. 2 is a diagram illustrating an operation of a gated camera.

FIG. 2 is a diagram illustrating an operation of the gated camera 20. FIG. 2 shows a state where the i-th range $RNG_i$ is measured as a range of interest (ROI). The illumination device 22 emits light during a light emission period $\tau_1$ between time points $t_0$ and $t_1$ in synchronization with the light emission timing signal S1. An uppermost stage shows a diagram of light beams in which a horizontal axis represents a time and a vertical axis represents a distance. A distance from the gated camera 20 to a near side boundary of the range $RNG_i$ is set as $d_{MINi}$, and a distance from the gated camera 20 to a far side boundary of the range $RNG_i$ is set as $d_{MAXi}$.

A round trip time $T_{MINi}$ until light departing from the illumination device 22 at a time point reaches the distance $d_{MINi}$ and then reflective light of the light returns to the image sensor 24 is $T_{MINi}=2\times d_{MINi}/c$. Where, c is the speed of light.

Similarly, a round trip time $T_{MAXi}$ until light departing from the illumination device 22 at a time point reaches the distance $d_{MAXi}$ and then reflective light of the light returns to the image sensor 24 is $T_{MAXi}=2\times d_{MAXi}/c$.

When it is desired to image only the object OBJ included in the range $RNG_i$, the camera controller 26 generates the exposure timing signal S2 so as to start exposure at a time point $t_2=t_0+T_{MINi}$ and end the exposure at a time point $t_3=t_1+T_{MAXi}$. This is one exposure operation.

When the i-th range $RNG_i$ is imaged, a plurality of times of exposure may be performed. In this case, the camera controller 26 may repeat a set of the above irradiation and exposure operations a plurality of times with a predetermined period $\tau_2$. At this time, the raw image data IMGr generated by the image sensor 24 is an integration result of the plurality of times of exposure.

In the present embodiment, the gated camera 20 optimizes a shutter speed (exposure time), the number of times of exposure, sensitivity, an irradiation intensity of the pulse illumination light, and the like (imaging parameters) for each range so that variation in the exposure (a luminance value of an object image in the slice image) for each range does not occur.

Figure 3A:
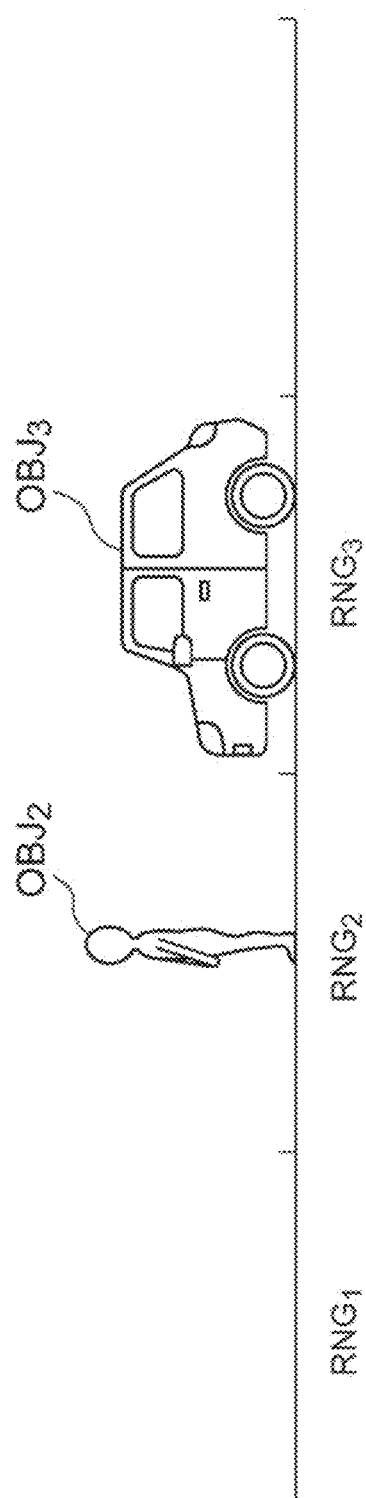
FIG. 3A and FIG. 3B are diagrams illustrating images obtained by the gated camera.
Figure 3B:
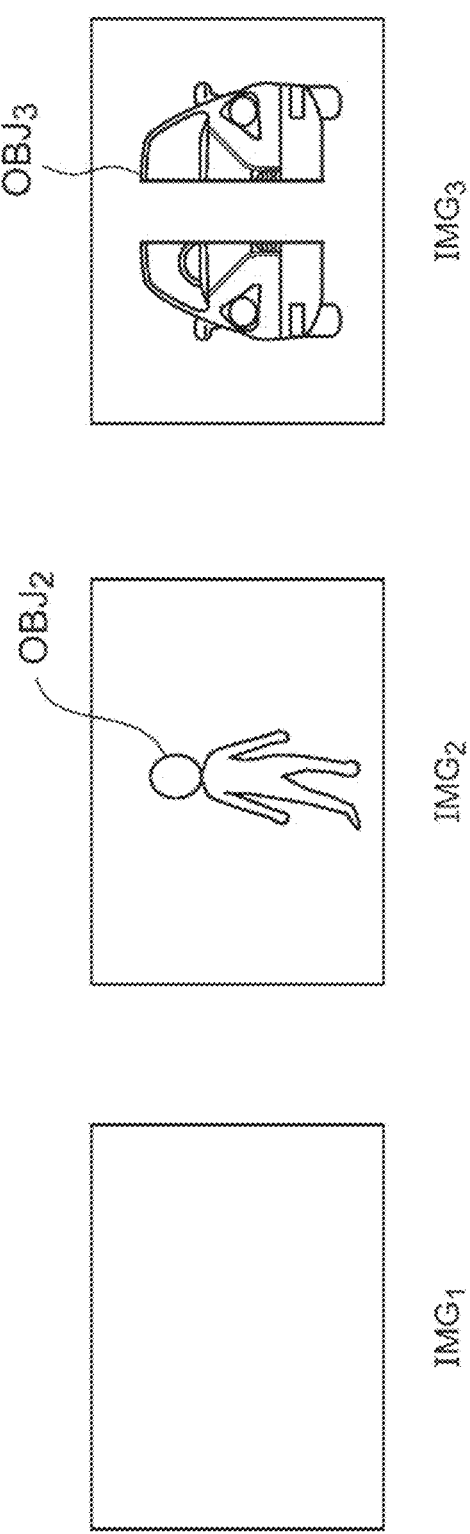

FIG. 3A and FIG. 3B are diagrams illustrating images obtained by the gated camera 20. In an example of FIG. 3A, an object (pedestrian) $OBJ_2$ is present in a range $RNG_2$, and an object (vehicle) $OBJ_3$ is present in a range $RNG_3$. FIG. 3B shows a plurality of slice images $IMG_1$ to $IMG_3$ obtained in a situation in FIG. 3A. When the slice image $IMG_1$ is captured, the image sensor 24 is exposed only by reflective light from the range $RNG_1$, so that no object image is captured in the slice image $IMG_1$.

When the slice image $IMG_2$ is captured, the image sensor 24 is exposed only by reflective light from the range $RNG_2$, so that only the object image $OBJ_2$ is captured in the slice image $IMG_2$. Similarly, when the slice image $IMG_3$ is captured, the image sensor 24 is exposed only by reflective light from the range $RNG_3$, so that only the object image $OBJ_3$ is captured in the slice image $IMG_3$. As described above, according to the gated camera 20, it is possible to separately image an object for each range.

Figure 4A:
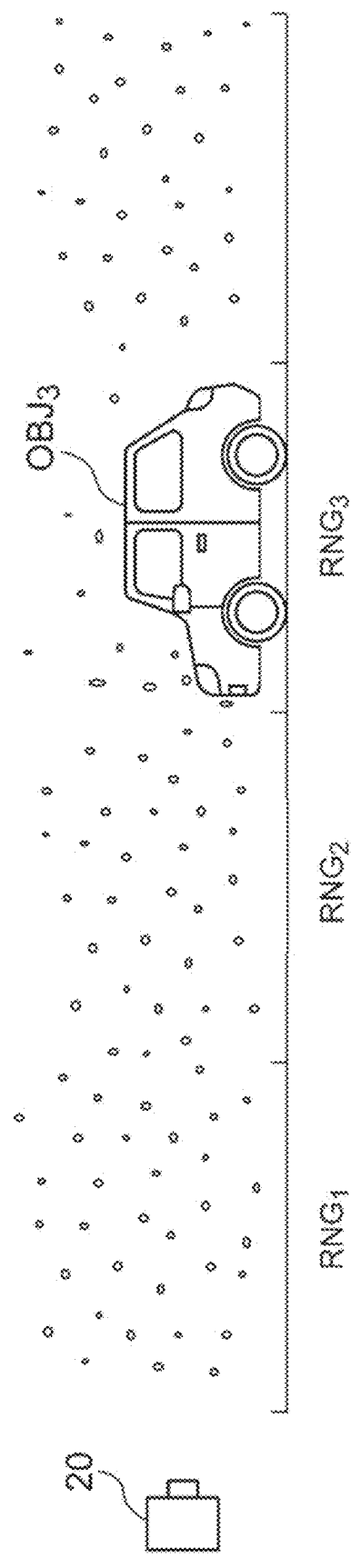
FIG. 4A to FIG. 4C are diagrams illustrating an advantage of the gated camera in bad weather.
Figure 4C:
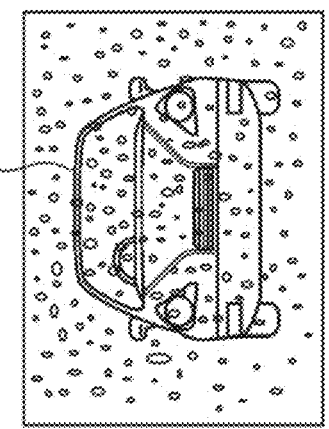
Figure 4B:
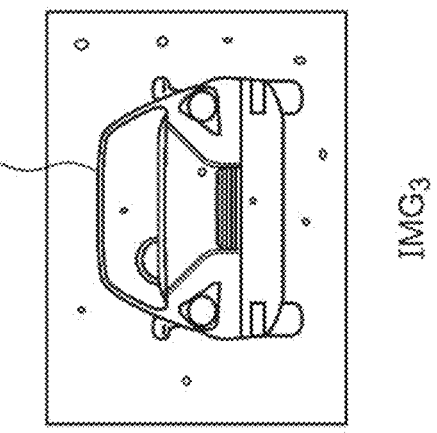

The gated camera 20 is advantageous in imaging in bad weather. Hereinafter, a reason thereof will be described. FIG. 4A to FIG. 4C are diagrams illustrating an advantage of the gated camera 20 in the bad weather. FIG. 4A shows an example of a traveling scene in the bad weather. The object (vehicle) $OBJ_3$ is present in the range $RNG_3$. In addition, points shown in the drawing schematically indicate obstacles such as raindrops, snow particles, or fog. FIG. 4B shows the slice image $IMG_3$ of the third range obtained in a situation in FIG. 4A. When the slice image $IMG_3$ is captured, the image sensor 24 is exposed only by the reflective light from the range $RNG_3$, so that the obstacles (raindrops, snow particles, or fog) in the ranges $RNG_1$ and $RNG_2$ are not imaged in the slice image $IMG_3$. That is, it is possible to remove rain, snow, or fog included in a range other than a range to be measured.

FIG. 4C shows an image obtained by imaging the same field of view by a general camera. When the imaging is performed by the general camera, reflective light from all objects in the range $RNG_1$ to $RNG_3$ is imaged, so that many obstacles are imaged so as to block the object $OBJ_3$.

From comparison of FIG. 4B and FIG. 4C, it can be seen that the slice image IMG generated by the gated camera 20 includes, in the bad weather, more information than the image obtained by the general camera.

Reference is made back to FIG. 1. In the present embodiment, the gated camera 20 is used as an auxiliary sensor that assists the main sensor group 50. Therefore, the gated camera 20 does not constantly operate, and an operation state (enable state EN) or a stop state (disable state DIS) is adaptively selected according to a traveling environment.

When the gated camera 20 is in the operation state, the camera controller 26 generates the light emission timing signal S1 and the exposure timing signal S2, so that slice images of a plurality of ranges are generated. In the stop state of the gated camera 20, the camera controller 26 does not generate the light emission timing signal S1 and the exposure timing signal S2, so that no slice image is generated.

In the bad weather, the slice image IMG generated by the gated camera 20 is supplied to the main controller 60. An output from the gated camera 20 is used for control of driving assistance or autonomous driving.

Figure 5:
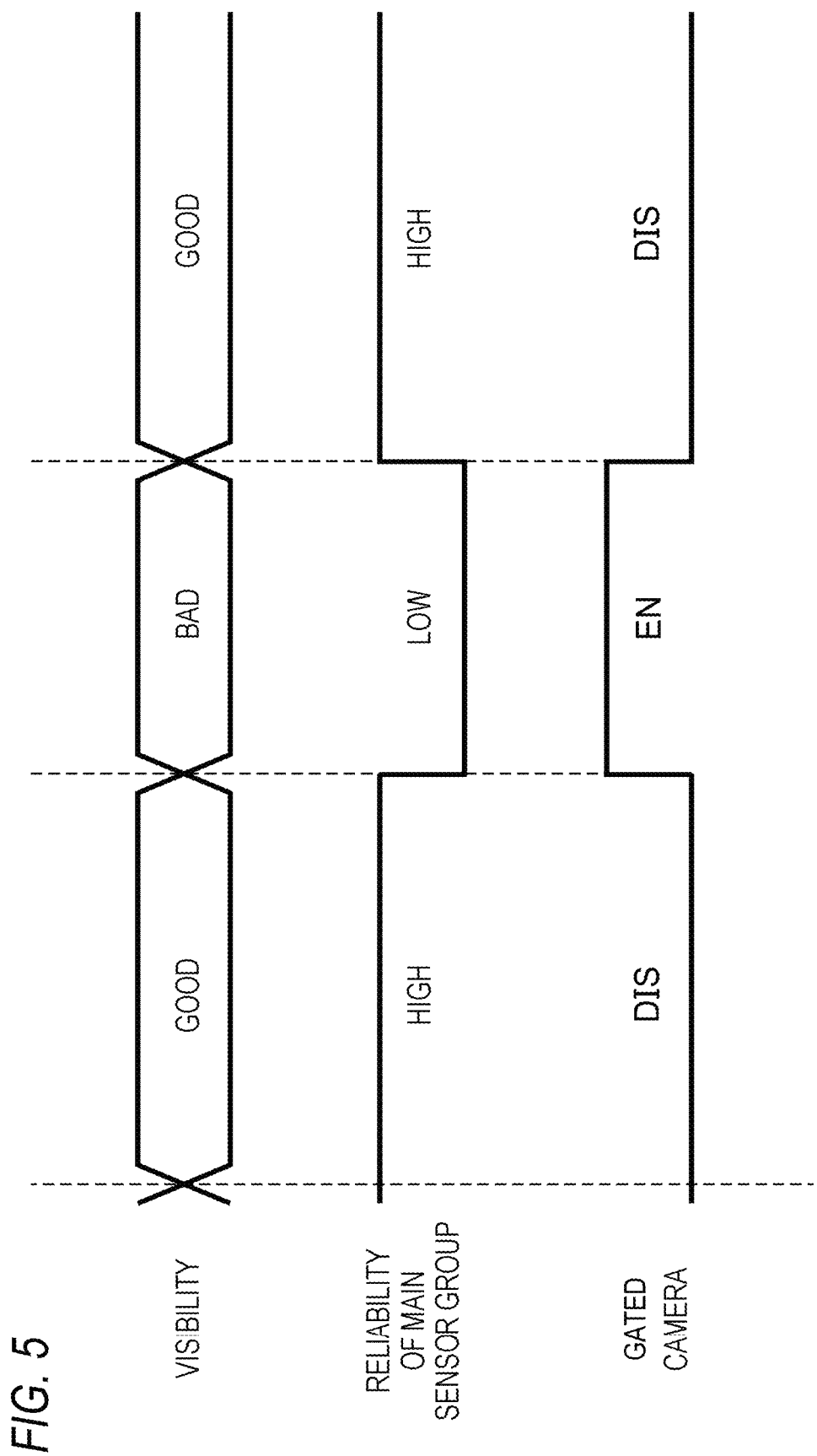
FIG. 5 is a time chart illustrating an operation of the sensing system.

A configuration of the sensing system 10A has been described above. Next, an operation thereof will be described. FIG. 5 is a time chart illustrating the operation of the sensing system 10A.

Under a condition that weather (visibility) is good, reliability of the main sensor group 50 is high. In this case, the gated camera 20 is in the stop state, and the main controller 60 detects the target object based on the output from the main sensor group 50.

Under a condition that weather (visibility) is bad, the reliability of the main sensor group 50 decreases. In this case, the gated camera 20 is in the operation state, and the main controller 60 detects the target object based on a detection result of the gated camera 20 instead of or in addition to the output from the main sensor group 50.

The operation of the sensing system 10A has been described above. According to the sensing system 10A, it is possible to prevent a reduction in performance of the sensing system 10A in the bad weather while preventing an increase in power consumption of the gated camera 20.

Reference is made back to FIG. 1. The gated camera 20 can switch between a plurality of imaging modes in the operation state. The plurality of imaging modes include the first imaging mode in which the performance is relatively high and the power consumption is high, and the second imaging mode in which the performance is relatively low and the power consumption is low.

Some examples of the plurality of imaging modes will be described.

First Example

The imaging modes may be different from each other in frame rate. The "frame rate" is a frequency at which all ranges to be measured are measured, and is a reciprocal of a frame period. In the imaging mode in which the frame rate is high, high-speed sensing can be performed, but the power consumption increases. In the imaging mode in which the frame rate is low, a sensing speed is reduced, but the power consumption can be reduced.

Figure 6:
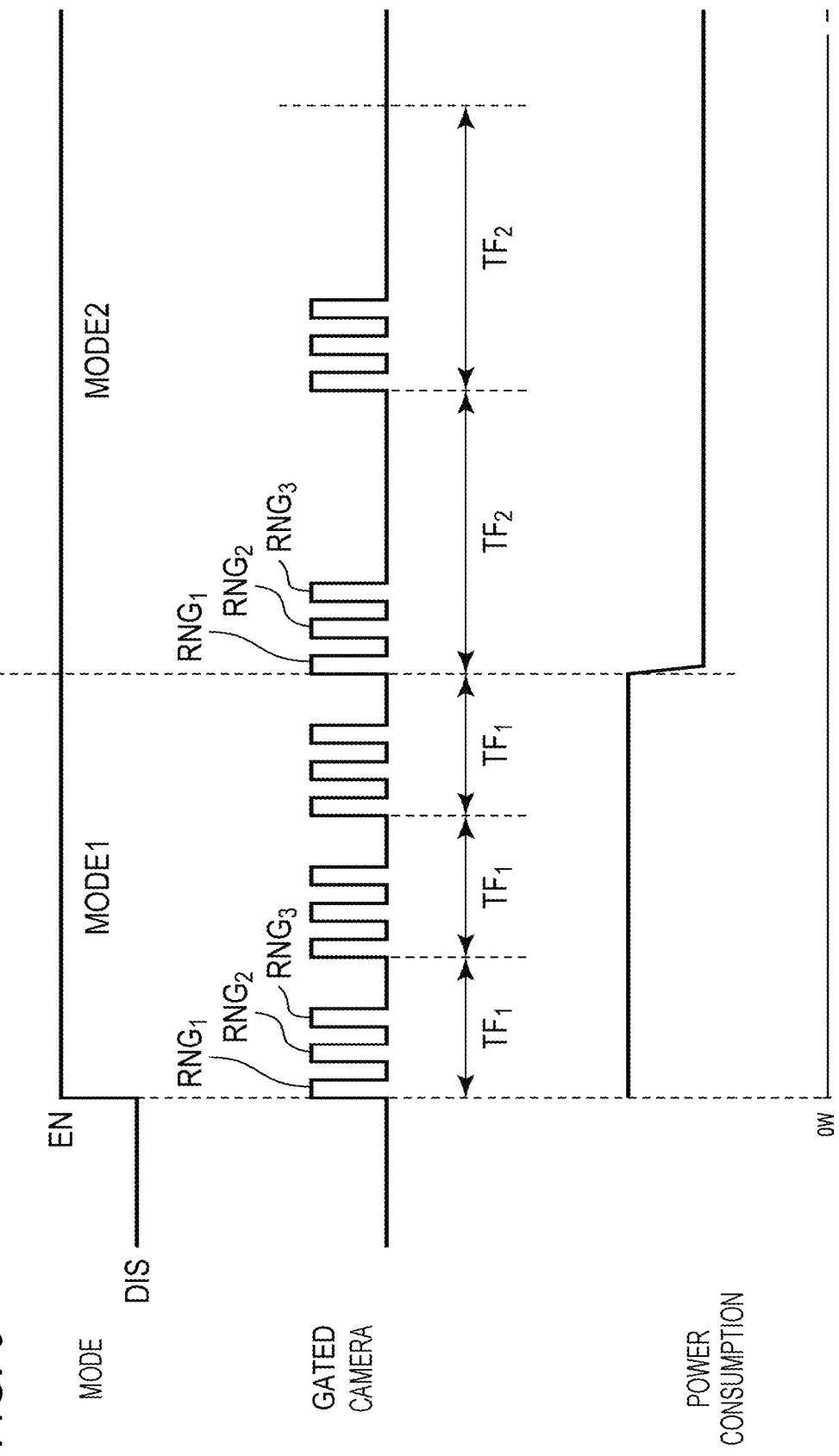
FIG. 6 is a diagram illustrating an operation of the gated camera according to a first example.

FIG. 6 is a diagram illustrating an operation of the gated camera 20 according to a first example. During a first imaging mode MODE1, imaging of a plurality of ranges $RNG_1$ to $RNG_3$ is executed with a first frame period $T_{F1}$. In this example, the number of ranges is three. Light emission and exposure may be repeatedly executed a plurality of times during an imaging period of one range.

During a second imaging mode MODE2, imaging of the plurality of ranges $RNG_1$ to $RNG_3$ is executed with a second frame period $T_{F2}$ ($T_{F2}>T_{F1}$). Due to a decrease in the frame rate, the power consumption in the second imaging mode MODE2 is lower than the power consumption in the first imaging mode MODE1.

Even in a situation where the gated camera 20 is required like in the bad weather, the highest performance may also not be required depending on the situation. For example, in a situation where accuracy (reliability) of sensing based on the output from the main sensor group 50 is high to some degree even in the bad weather, no trouble occurs in sensing even if the frame rate of the gated camera 20 decreases. Therefore, in such a case, the power consumption can be reduced by selecting the second imaging mode MODE2.

For example, the imaging mode may be selected according to an amount of rain, an amount of snow, or a fog density. For example, the first imaging mode MODE1 may be selected in a situation where rain or snow is relatively heavy or fog is relatively thick, and the second imaging mode MODE2 may be selected in a situation where rain or snow is relatively light or fog is relatively thin.

Alternatively, the mode may be selected according to a cause of the current bad weather (which of rain, snow, and fog). For example, the first imaging mode may be selected during generation of the fog or snowfall, and the second imaging mode MODE2 may be selected during rainfall. For example, presence or absence of the rainfall, presence or absence of the snowfall, presence or absence of the fog, or the like may be acquired based on information supplied from an outside of the vehicle by wireless communication, such as vehicle information and communication system (registered trademark) (VICS) information.

Alternatively, switching can be performed between the first imaging mode MODE1 and the second imaging mode MODE2 according to the traveling scene. For example, the first imaging mode MODE1 may be selected in a situation where a traveling speed is relatively high, and the second imaging mode MODE2 may be selected in a situation where a traveling speed is relatively low.

Second Example

In a second example, the imaging modes are different from each other in the number of ranges to be measured. For example, the three ranges $RNG_1$ to $RNG_3$ are measured in the first imaging mode MODE1, and the two ranges $RNG_1$ and $RNG_2$ are measured in the second imaging mode MODE2.

Figure 7:
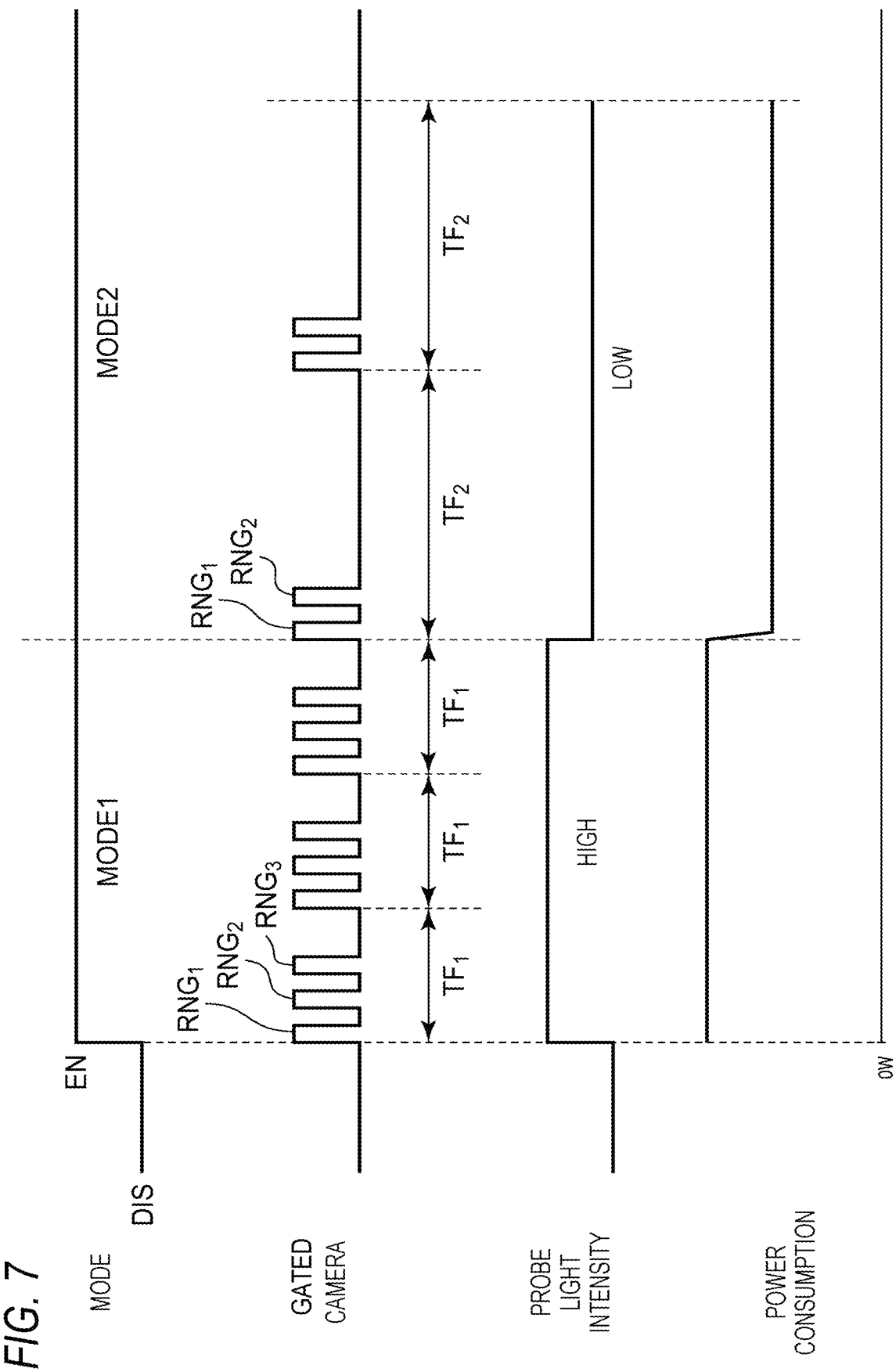
FIG. 7 is a diagram illustrating an operation of the gated camera according to a second example.

FIG. 7 is a diagram illustrating an operation of the gated camera 20 according to the second example. For example, it is assumed that the first range $RNG_1$ is 0 m to 25 m, the second range $RNG_2$ is 25 m to 50 m, and the third range $RNG_3$ is 50 m to 100 m. Depending on the weather, a situation where sensing of a location greater than 50 m cannot be performed may occur even based on the performance of the gated camera 20. In such a case, the power consumption can be reduced by selecting the second imaging mode MODE2.

A range of visibility required for control of the autonomous driving or control of the driving assistance depends on a vehicle speed. Specifically, the higher the speed is, the more distant target object information is required. Therefore, the first imaging mode MODE1 may be selected when the vehicle speed is higher than a threshold value, and the second imaging mode MODE2 may be selected when the vehicle speed is lower than the threshold value.

In FIG. 7, the frame rate in the second imaging mode MODE2 is lower than the frame rate in the first imaging mode MODE1, but the frame rates may be the same.

A distance (farthest imaging distance) to a far side boundary of a farthest range in the first imaging mode MODE1 is $d_{MAX3}$, a farthest imaging distance in the second imaging mode MODE2 is $d_{MAX2}$, and the first imaging mode MODE1 and the second imaging mode MODE2 are different from each other in the farthest imaging distance.

In such a case, an intensity of the pulse illumination light in the second imaging mode MODE2 may be lower than that in the first imaging mode MODE1 as shown in FIG. 7. The intensity of the pulse illumination light in FIG. 7 is not intended to be continuous light emission. In the second imaging mode MODE2, it is not necessary to project the pulse illumination light to a distant distance, so that the intensity can be reduced. Further, an amount of heat generated by the illumination device 22 can be reduced.

Third Example

Figure 8:
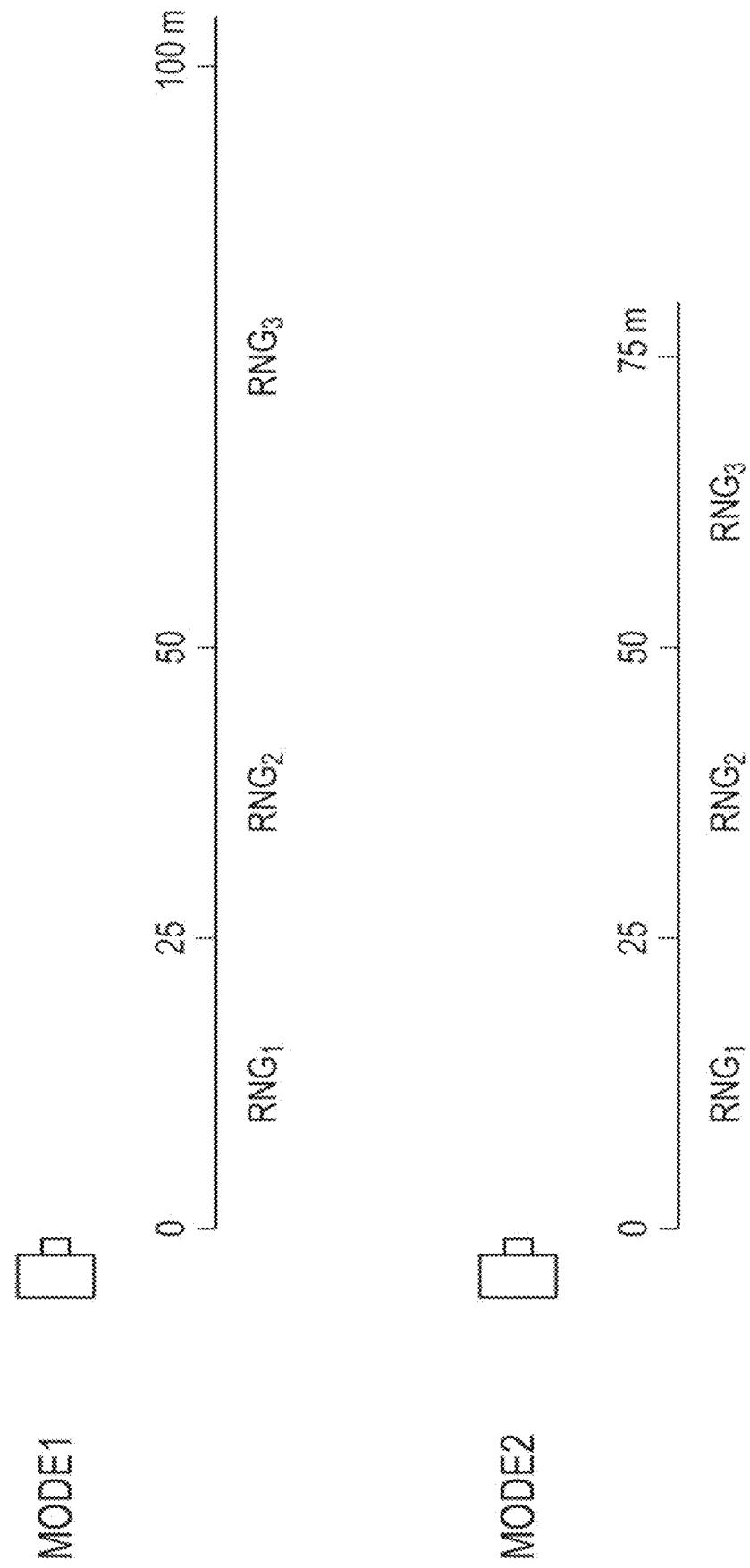
FIG. 8 is a diagram illustrating imaging modes according to a third example.

In a third example, the imaging modes are different from each other in depths of the plurality of ranges. FIG. 8 is a diagram illustrating the imaging modes according to the third example. For example, in the first imaging mode MODE1, the first range $RNG_1$ is 0 m to 25 m, the second range $RNG_2$ is 25 m to 50 m, and the third range $RNG_3$ is 50 m to 100 m. In contrast, in the second imaging mode MODE2, the first range $RNG_1$ is 0 m to 25 m, the second range $RNG_2$ is 25 m to 50 m, and the third range $RNG_3$ is 50 m to 75 m. That is, the farthest imaging distance in the first imaging mode MODE1 is 100 m, whereas the farthest imaging distance in the second imaging mode MODE2 is as short as 75 m.

In the third example, similarly to the second example, it is not necessary to project the pulse illumination light to the distant distance in the second imaging mode MODE2, so that the intensity can be reduced. Further, an amount of heat generated by the illumination device 22 can be reduced.

Similarly to the second example, selection of the imaging mode in the third example may be performed based on whether the weather or the visibility is good or bad, or may be performed based on the vehicle speed.

Fourth Example

In a fourth example, the gated camera 20 can switch to the standby mode in addition to the plurality of imaging modes. In the standby mode, the gated camera 20 is in a state where imaging can be performed at any time, does not perform voluntary imaging and stands by. In the standby mode, the camera controller 26 can communicate with the main controller 60, and immediately executes the imaging when receiving an imaging instruction command from the main controller 60. By performing the imaging only when the camera controller 26 is instructed, wasteful power consumption can be reduced.

Next, control of the operation state/stop state and control of the imaging mode of the gated camera 20 will be described.

In the present embodiment, the gated camera 20 itself autonomously performs the control of the operation state/stop state and the control of the imaging mode of the gated camera 20.

Control Method 1

In a control method 1, the gated camera 20 performs switching between the operation state and the stop state, and selection of the imaging mode, based on the slice image IMG generated by the gated camera 20 itself.

The subject included in the specific range in the depth direction of the field of view is imaged in the slice image IMG. By using the property, it is possible to estimate the weather and whether the visibility is good or bad, and to use the estimation result for the control of the gated camera. Weather estimation and visibility estimation based on the slice image IMG will be described later.

The camera controller 26 determines operation/stop of the gated camera 20 based on the slice image IMG. The camera controller 26 switches the gated camera 20 to the operation state in a situation where the reliability of the main sensor group 50 is estimated to decrease.

Further, the camera controller 26 selects the first imaging mode MODE1 or the second imaging mode MODE2 based on the slice image IMG. Conditions for the selection may be determined based on the first to fourth examples related to the imaging modes.

In the control method 1, in the stop state, the gated camera 20 performs intermittently (for example, at intervals of several tens of seconds to several minutes) the imaging for controlling the imaging mode and the operation/stop.

Control Method 2

In a control method 2, the camera controller 26 of the gated camera 20 performs switching between the operation state and the stop state based on at least one vehicle signal. Examples of the vehicle signal include an output from a rain sensor, an output from a fog sensor, vehicle speed information, a fail signal indicating malfunction of a main sensor, a fail signal indicating malfunction of a main controller or a decrease in accuracy of recognition performed by the main controller, a control signal of a wiper, a control signal of a fog lamp, and the like. When it is determined that the weather is bad based on the vehicle signal, the camera controller 26 causes the gated camera 20 to be in the operating state so as to start the imaging.

The camera controller 26 executes the imaging mode based on the slice image IMG in the same manner as in the control method 1.

In the control method 2, unlike the control method 1, the imaging for controlling the operation/stop is not necessary during the stop state.

Control Method 3

In a control method 3, the camera controller 26 performs both the switching between the operation state and the stop state, and the control of the imaging mode, based on the at least one vehicle signal.

Control Method 4

In a control method 4, the camera controller 26 performs the switching between the operation state and the stop state based on the slice image IMG, and performs the control of the imaging mode based on the at least one vehicle signal.

The control of the operation state/stop state and the control of the imaging mode may be performed based on both analysis results of the vehicle signal and the slice image.

The imaging mode of the gated camera 20 may be controlled by the main controller 60. In this case, the main controller 60 may determine the imaging mode of the gated camera 20 based on the vehicle signal.

Second Embodiment

Figure 9:
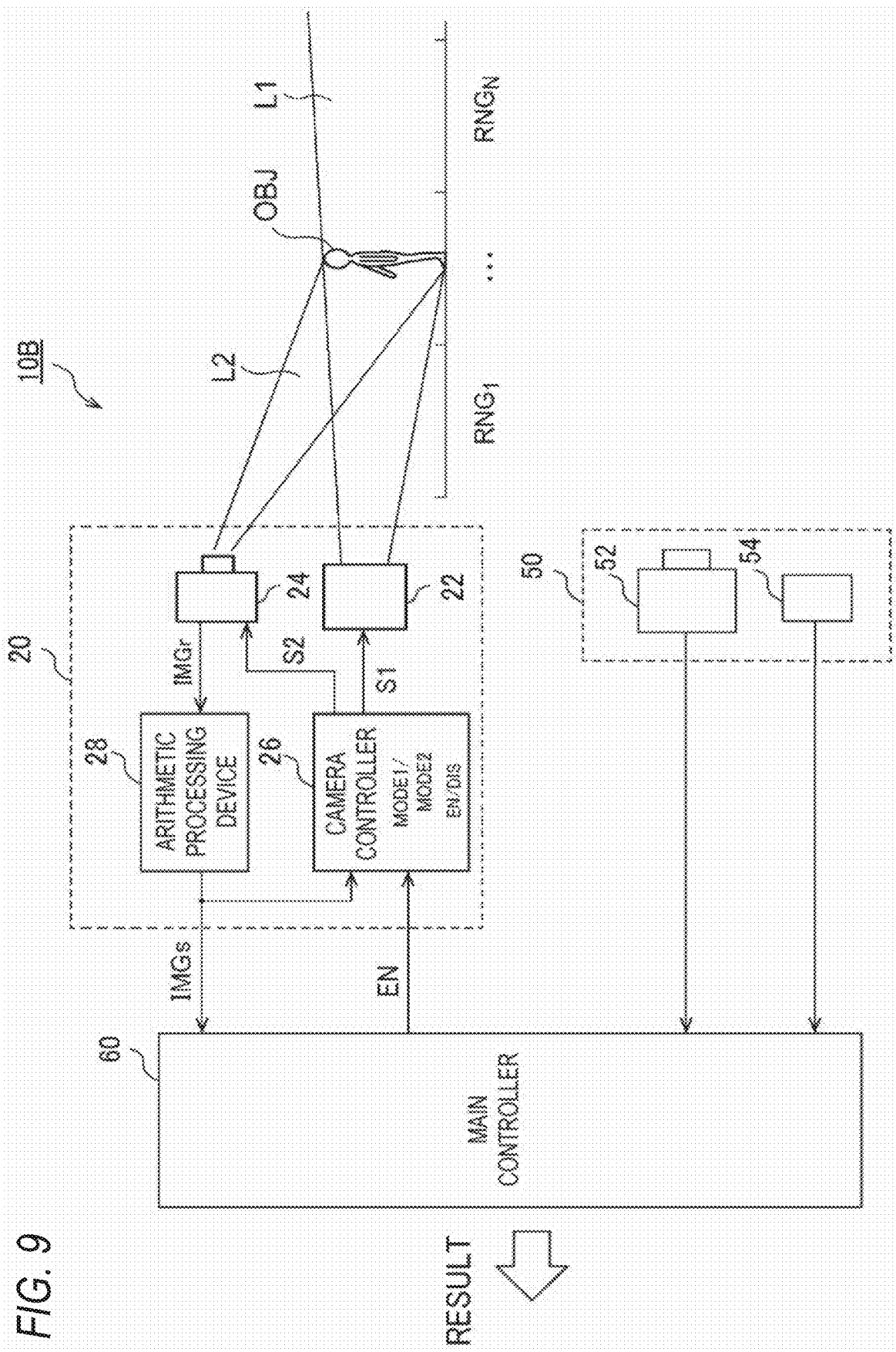
FIG. 9 is a block diagram of a sensing system according to a second embodiment.

FIG. 9 is a block diagram of a sensing system 10B according to a second embodiment. In the second embodiment, the operation state/stop state of the gated camera 20 is controlled based on an enable signal EN from the outside, and the gated camera 20 itself autonomously controls the imaging mode of the gated camera 20.

For example, in FIG. 9, the operation state/stop state of the gated camera 20 is controlled by the main controller 60. The main controller 60 may determine the operation state/stop state of the gated camera 20 and generate the enable signal EN based on at least one piece of vehicle signal in the same manner as that described in the first embodiment. The main controller 60 may control the operation state/stop state of the gated camera 20 based on the slice image IMG generated by the gated camera 20.

Alternatively, the main controller 60 may control the operation state/stop state of the gated camera 20 based on both the vehicle signal and the slice image.

On the other hand, in the second embodiment, the camera controller 26 may select the imaging mode of the gated camera 20 based on the slice image IMG. Alternatively, the camera controller 26 may select the imaging mode of the gated camera 20 based on the vehicle signal. Alternatively, the camera controller 26 may select the imaging mode of the gated camera 20 based on both the vehicle signal and the slice image.

Third Embodiment

Figure 10:
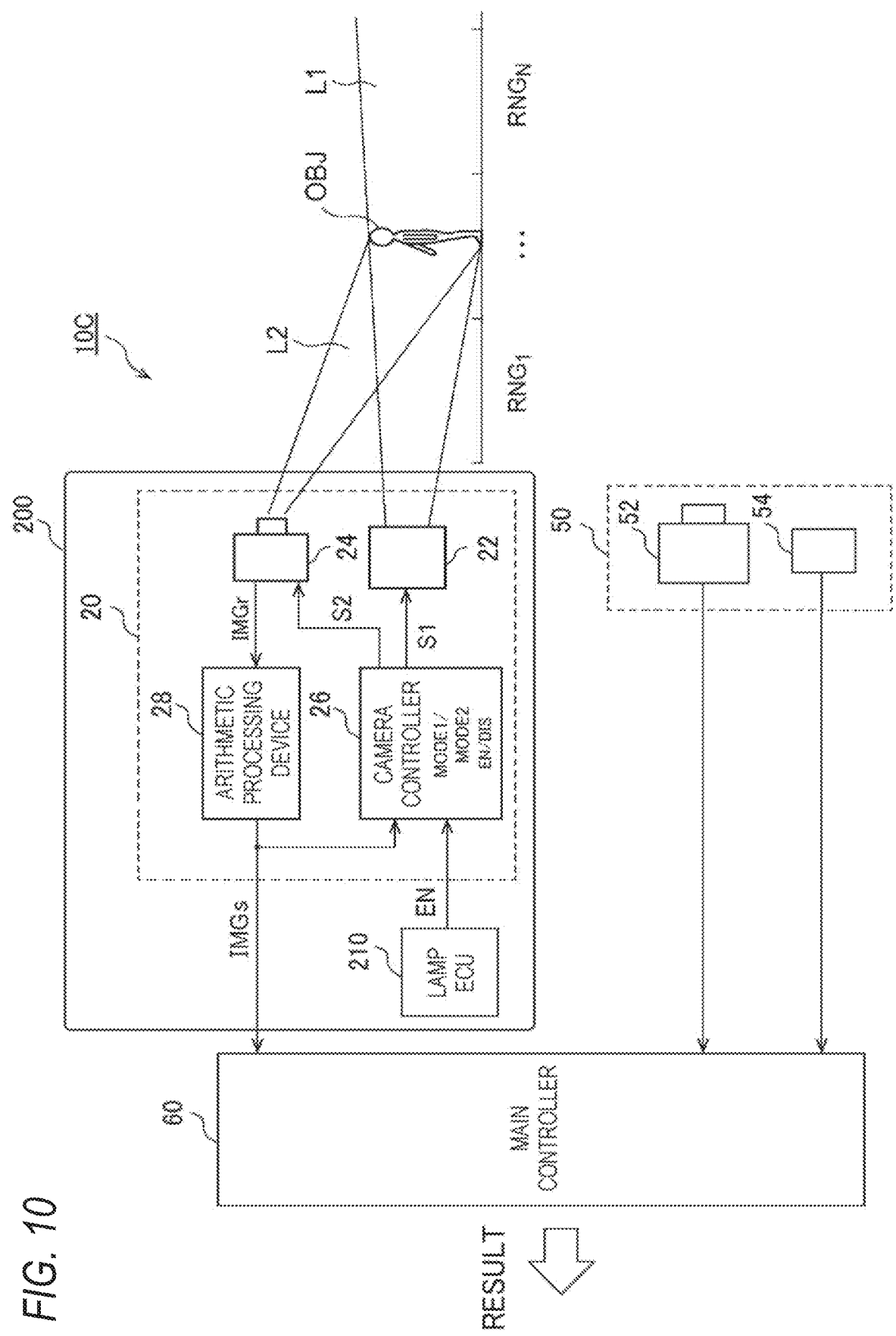
FIG. 10 is a block diagram of a sensing system according to a third embodiment.

FIG. 10 is a block diagram of a sensing system 10C according to a third embodiment. In the third embodiment, the gated camera 20 is mounted in a vehicle lamp 200. The vehicle lamp 200 includes a lamp electronic control unit (ECU) 210 that integrally controls a low beam and a high beam (not shown).

The operation state/stop state of the gated camera 20 is controlled based on the enable signal EN generated by the lamp ECU 210, and the gated camera 20 itself autonomously controls the imaging mode of the gated camera 20. The lamp ECU 210 controls the operation state/stop state of the gated camera 20 based on at least one of the vehicle signal and the slice image.

Fourth Embodiment

Figure 11:
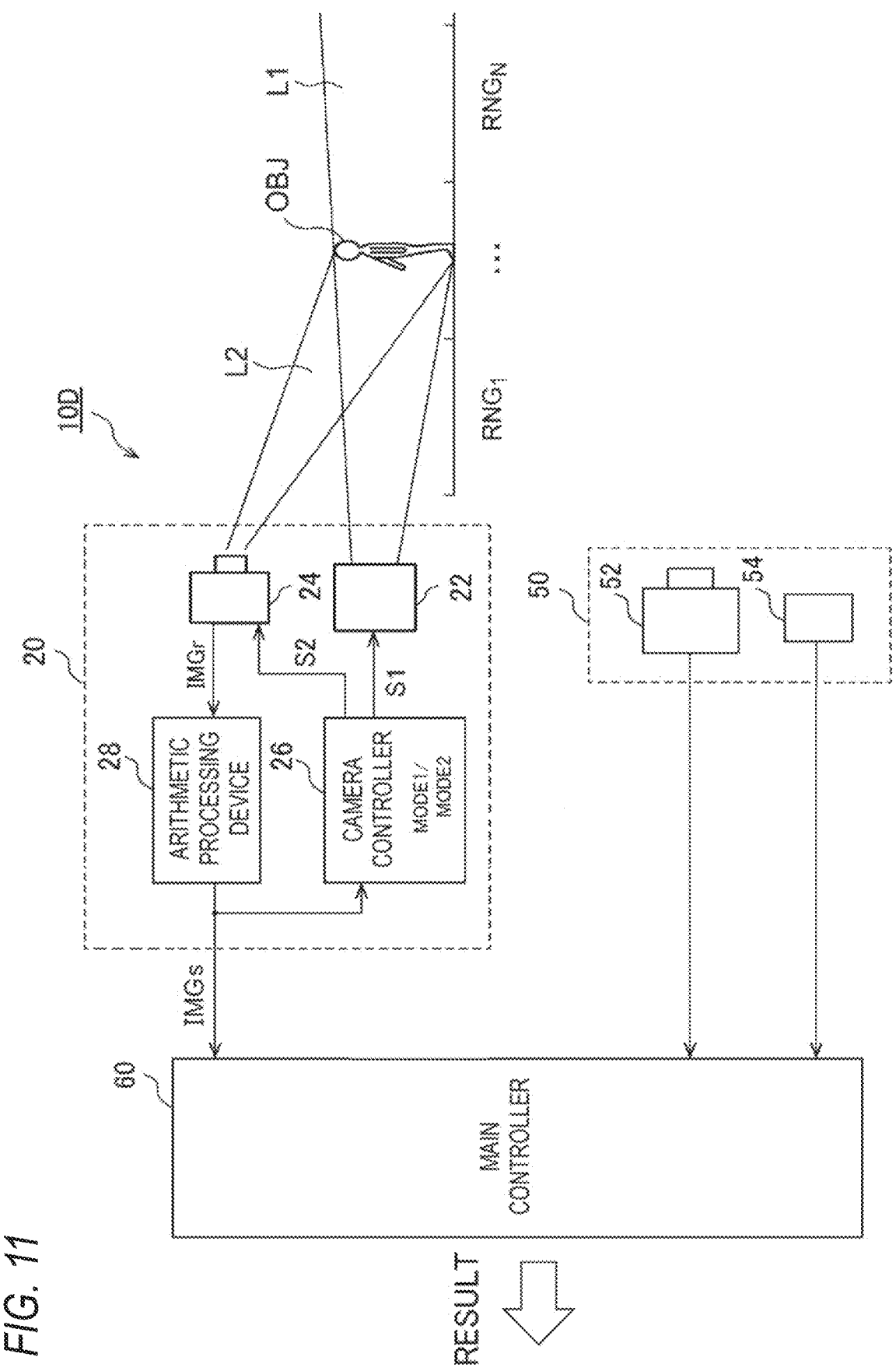
FIG. 11 is a block diagram of a sensing system according to a fourth embodiment.

FIG. 11 is a block diagram of a sensing system 10D according to a fourth embodiment. In the fourth embodiment, the gated camera 20 basically constantly operates during traveling, and can switch only the imaging mode.

The gated camera 20 (camera controller 26) selects the imaging mode based on at least one of the slice image IMG and the vehicle signal.

Fifth Embodiment

Figure 12:
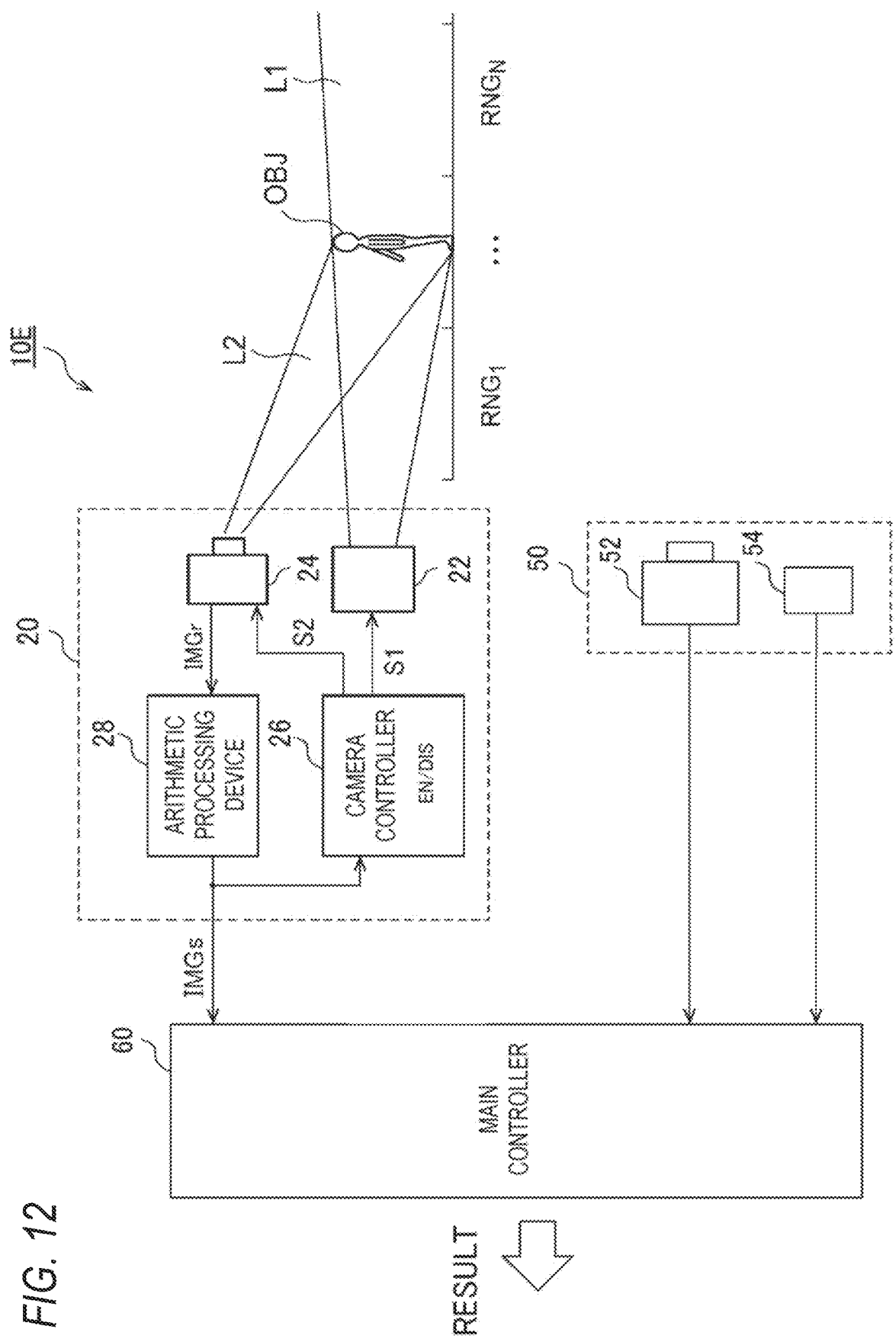
FIG. 12 is a block diagram of a sensing system according to a fifth embodiment.

FIG. 12 is a block diagram of a sensing system 10E according to a fifth embodiment. In the fifth embodiment, the gated camera 20 does not support switching between the plurality of imaging modes, and can perform only the switching between the operation state (enable state) and the stop state (disable state).

The gated camera 20 (camera controller 26) performs the switching between the operation state and the stop state of the gated camera 20 based on at least one of the slice image IMG and the vehicle signal.

Sixth Embodiment

Figure 13:
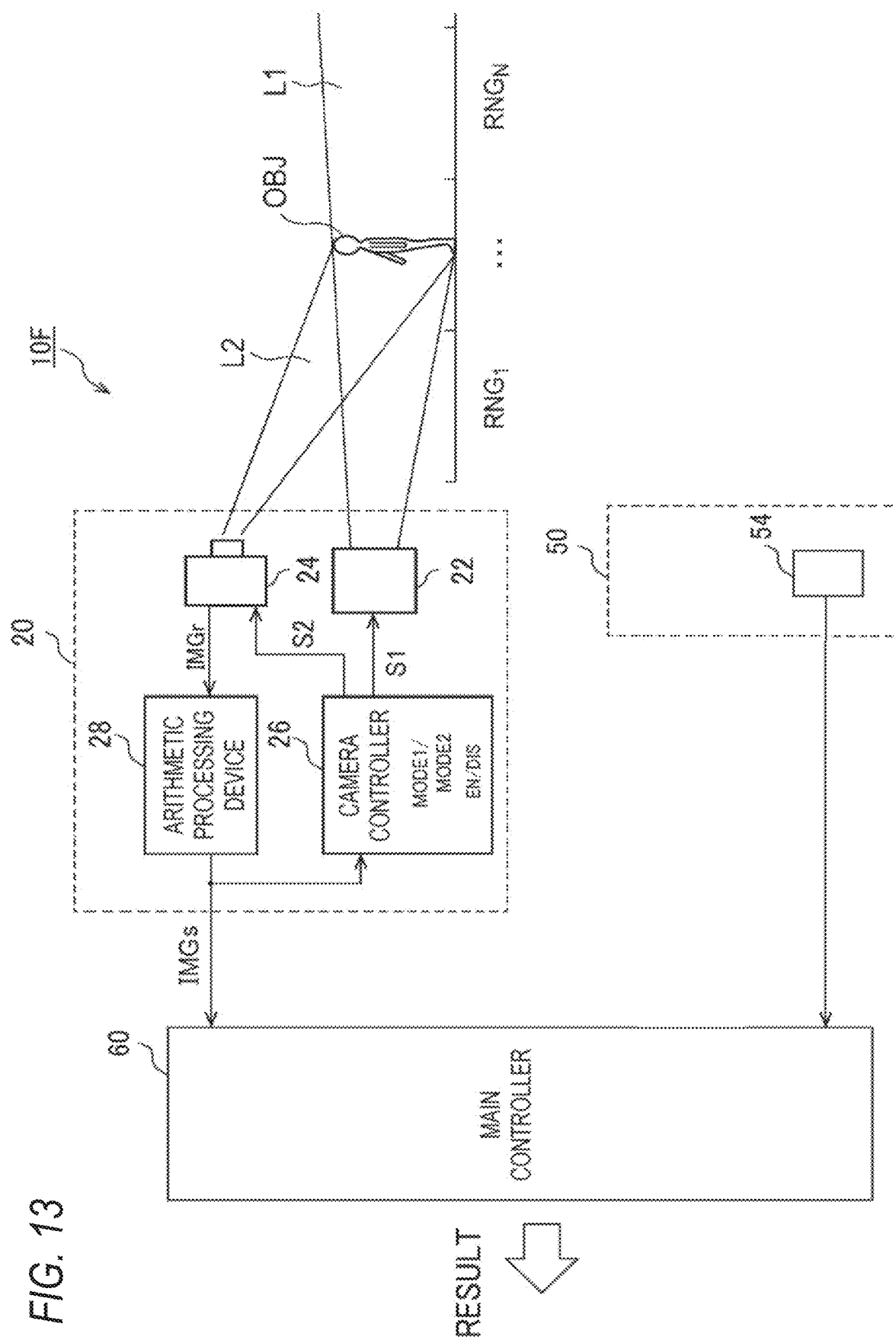
FIG. 13 is a block diagram of a sensing system according to a sixth embodiment.

FIG. 13 is a block diagram of a sensing system 10F according to a sixth embodiment. In the sixth embodiment, a part (the camera 52 in this example) or the whole of the main sensor group 50 is omitted.

As described in the first to fifth embodiments, the gated camera 20 can control both or either one of the switching between the operation state and the stop state, and the switching of the imaging mode. The switching between the operation state and the stop state, and the switching of the imaging mode are as described in the first to fifth embodiments.

Figure 14A:
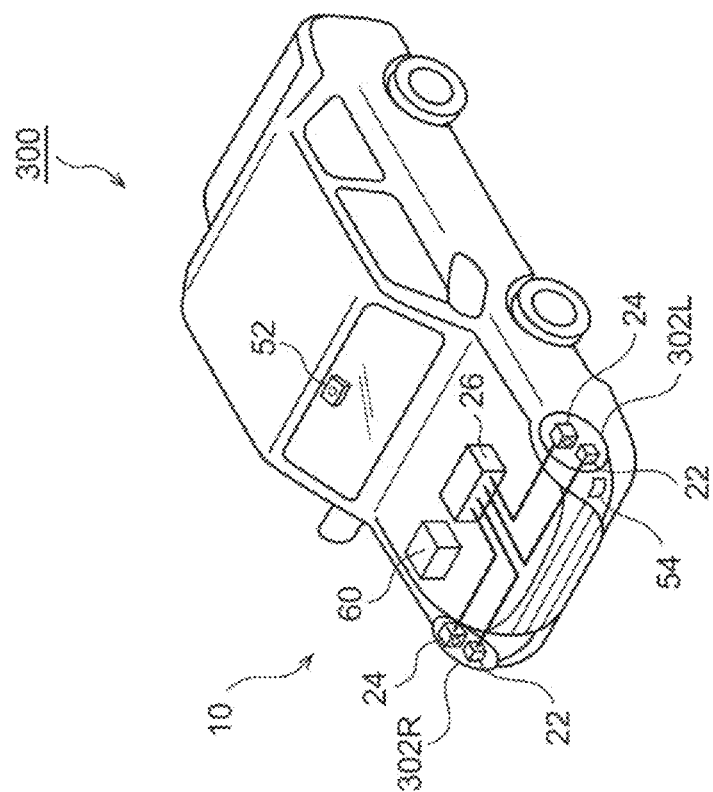
FIG. 14A and FIG. 14B are each a diagram showing an automobile including a sensing system according to an embodiment.
Figure 14B:
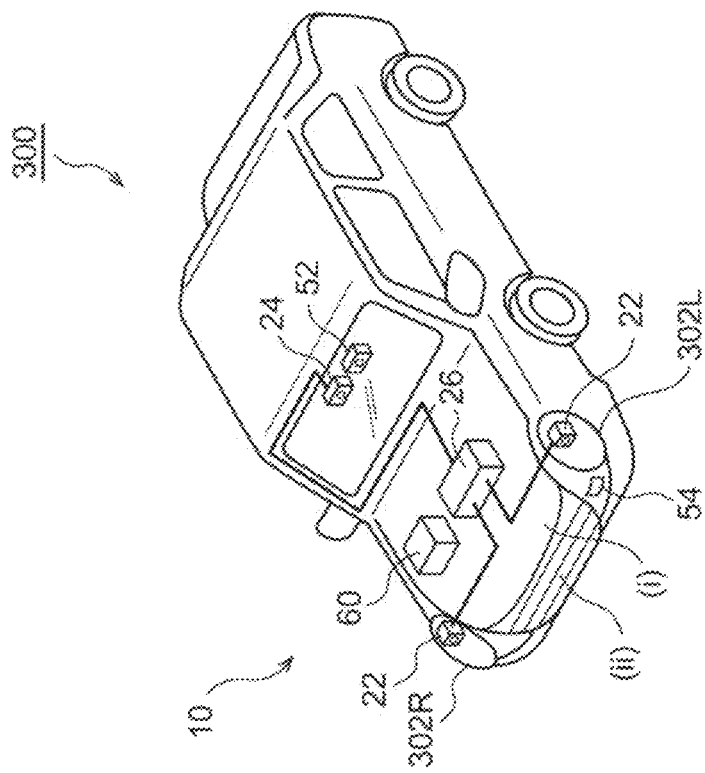

FIG. 14A and FIG. 14B are each a diagram showing an automobile 300 including a sensing system 10 according to an embodiment. Reference is made to FIG. 14A. The automobile 300 includes headlamps 302L and 302R.

The camera 52 and the millimeter wave radar 54 of the main sensor group 50 are disposed at locations on the vehicle suitable for sensing. For example, the camera 52 is provided on a back side of a rear-view mirror, and the millimeter wave radar 54 is disposed in front of the vehicle. The main controller 60 is disposed in a vehicle interior or an engine compartment.

The illumination device 22 of the gated camera 20 is built in at least one of the left and right headlamps 302L and 302R. The image sensor 24 can be attached to a part of the vehicle, for example, on the back side of the rear-view mirror. Alternatively, the image sensor 24 may be provided at a front grille or a front bumper. The camera controller 26 may be provided in the vehicle interior, may be provided in the engine compartment, or may be built in a headlamp.

Reference is made to FIG. 14B. As shown in FIG. 14B, the image sensor 24 may be built in any one of the left and right headlamps 302L and 302R.

Figure 15:
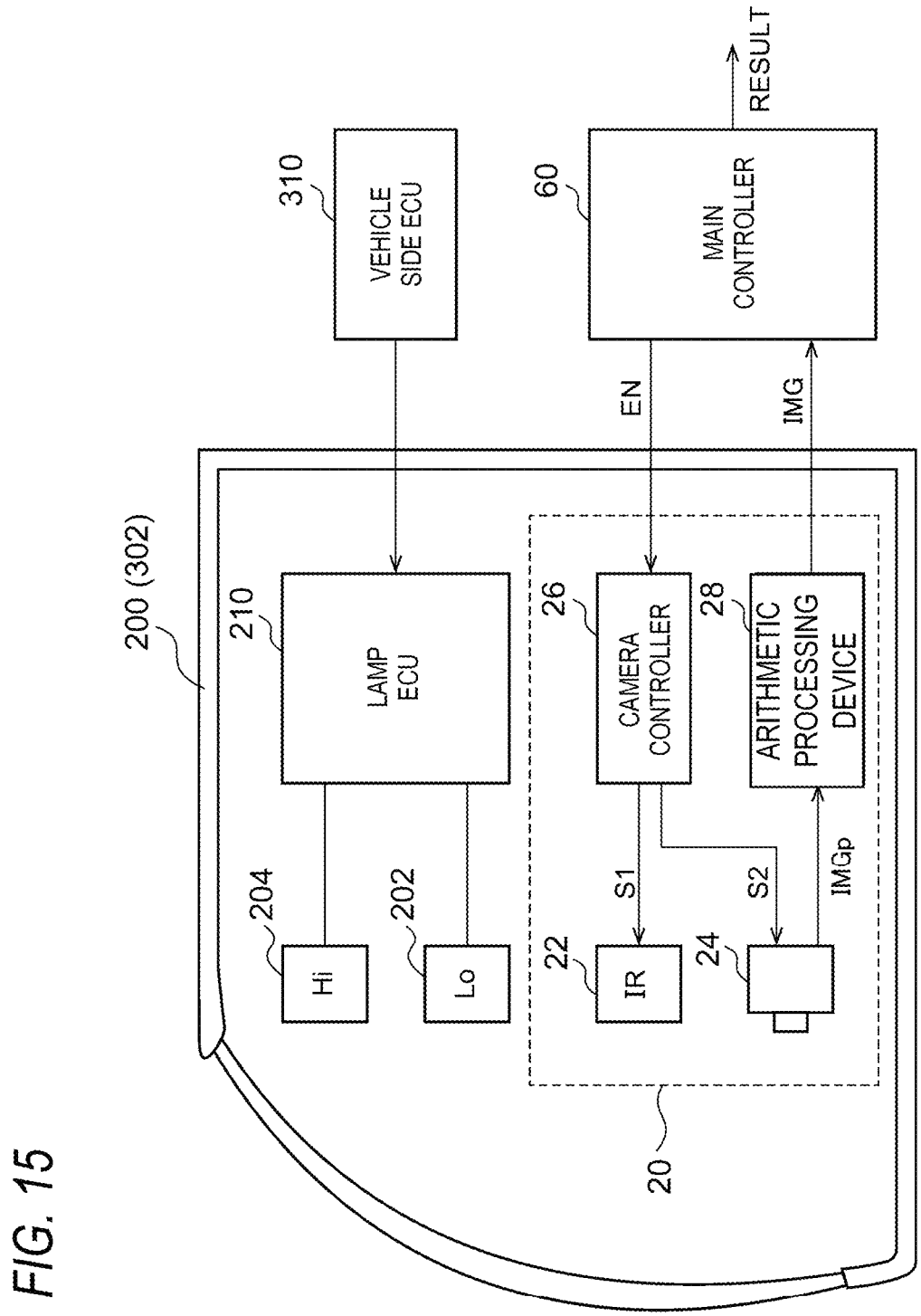
FIG. 15 is a block diagram showing a vehicle lamp according to an embodiment.

FIG. 15 is a block diagram showing the vehicle lamp 200 according to an embodiment. The vehicle lamp 200 corresponds to a headlamp 302 in FIG. 14B, and includes a low beam unit 202, a high beam unit 204, the lamp ECU 210, and the gated camera 20.

The lamp ECU 210 controls turning on, turning off or light distribution of the low beam unit 202 and the high beam unit 204 based on a control command from a vehicle side ECU 310. In some embodiments and examples, the lamp ECU 210 may perform the switching between the operation state and the stop state of the gated camera 20.

The gated camera 20 is built in a housing of the vehicle lamp 200. At least one of the image sensor 24, the camera controller 26, and the arithmetic processing device 28 may be provided outside the housing of the vehicle lamp 200.

Visibility Estimation and Weather Estimation Based on Slice Image

The gated camera can freely set a range of interest for a depth, and can image only an object included in the range of interest. A technique will be described in which the gated camera 20 itself acquires information on weather based on the slice image IMG captured by the gated camera 20 itself by using the characteristic.

Figure 16:
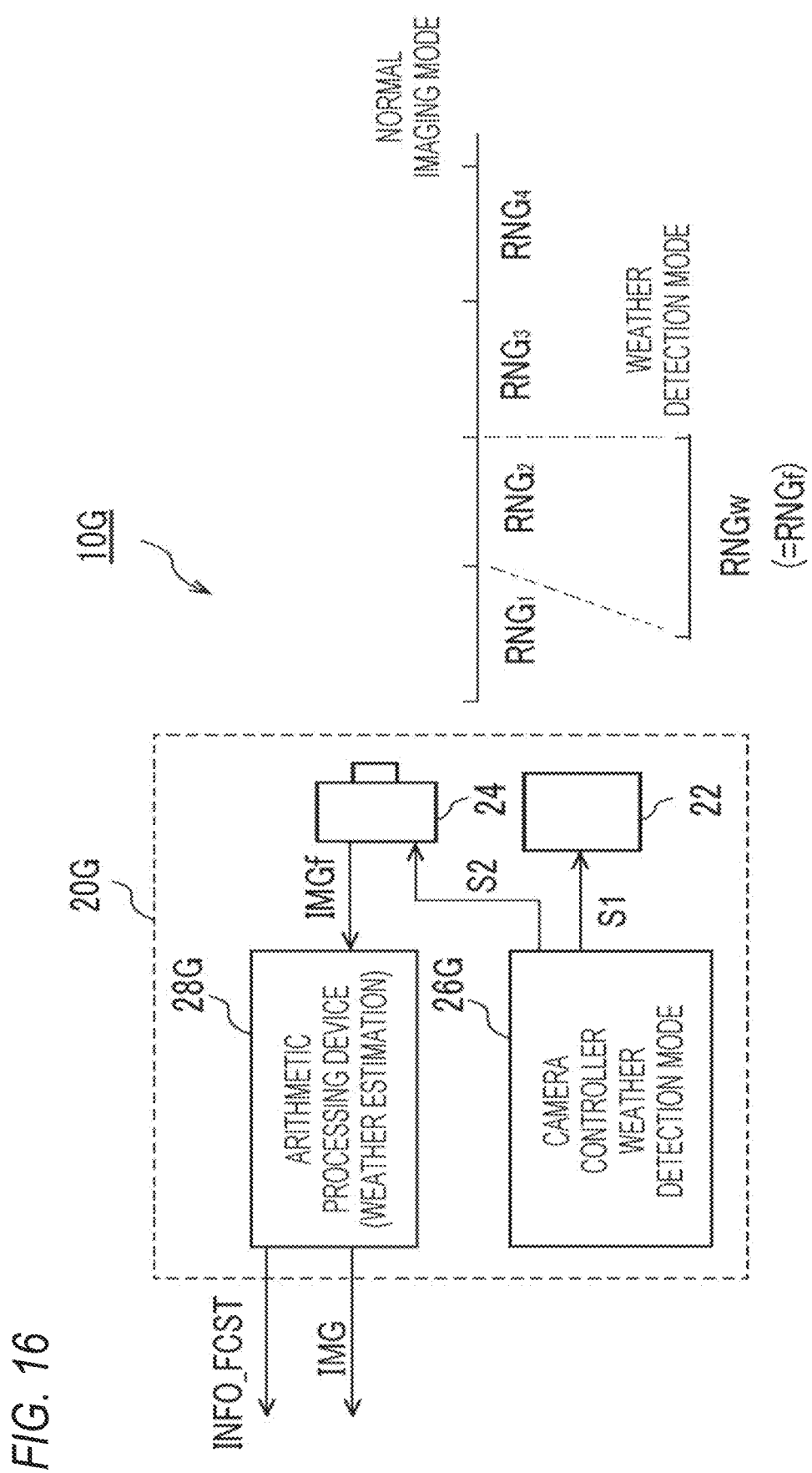
FIG. 16 is a block diagram of a sensing system including a gated camera according to a seventh embodiment.

FIG. 16 is a block diagram of a sensing system 10G including a gated camera 20G according to a seventh embodiment. The gated camera 20G includes the illumination device 22, the image sensor 24, a camera controller 26G, and an arithmetic processing device 28G.

The camera controller 26G can select a weather detection mode in addition to a normal imaging mode. In the weather detection mode, imaging is performed on a predetermined range determined for weather detection. The arithmetic processing device 28G acquires information on weather INFO_FCST based on image data (slice image) IMGf obtained for the predetermined range in the weather detection mode.

The fog, the rain, or the snow is randomly, in other words, uniformly present in a plane and in the depth direction of the field of view. On the other hand, target objects (vehicles, pedestrians, traffic signs, delineators, or the like) other than the fog, the rain, and the snow are locally present in a non-random manner. That is, in the bad weather, light diffusely reflected by the uniformly distributed fog, rain, or snow is imaged in a slice image obtained for a predetermined range RNGf, which exhibits a property similar to that of random noise. By analyzing the image data IMGf based on the property, the information on weather can be obtained.

Hereinafter, specific examples of the weather detection will be described based on first to third examples.

First Example

In the weather detection mode, the camera controller 26G performs imaging with a wide range RNGw as the predetermined range RNGf, and the wide range RNGw is longer in the depth direction than that in the normal imaging mode. The wide range RNGw may be obtained by enlarging, to a near side, a range in the normal imaging mode. For example, it is assumed that in the normal imaging mode, $RNG_1$ is set as 0 m to 25 m, $RNG_2$ is set as 25 m to 50 m, $RNG_3$ is set as 50 m to 75 m, $RNG_4$ is set as 75 m to 100 m, and imaging is performed for four ranges $RNG_1$ to $RNG_4$. The wide range RNGw for the weather detection may be a range obtained by expanding the second range $RNG_2$ in a near side direction, and may be set as, for example, 10 m to 50 m. In order to enlarge the range, the camera controller 26G lengthens the exposure time of the image sensor 24.

Figure 17A:
FIG. 17A and FIG. 17B are each a diagram showing a slice image captured by the gated camera.
Figure 17B:

FIG. 17A and FIG. 17B are each a diagram showing a slice image captured by the gated camera. FIG. 17A is the slice image which is obtained for a range (25 m to 100 m) in the normal imaging mode in the bad weather (in fog in which a range of visibility is about 50 m based on energy of infrared light). FIG. 17B is the slice image IMGf which is obtained for the wide range IMGw (6 m to 100 m) in the same situation, and the wide range IMGw is obtained by enlarging the range in FIG. 17A to a near side.

Only reflective light from an object present on a far side is imaged in the slice image in of FIG. 17A, whereas the reflective light from the object on the far side and reflective light from fog (rain or snow) located in a range expanded to the near side are imaged in the slice image IMGf in FIG. 17B. Therefore, the object on the far side is hidden by the fog, the rain, or the snow on the near side. That is, the slice image IMGf widely captured on the near side includes many pieces of information of the fog (rain or snow). By capturing such a slice image IMGf in the weather detection mode, it is possible to estimate the weather.

Figure 18A:
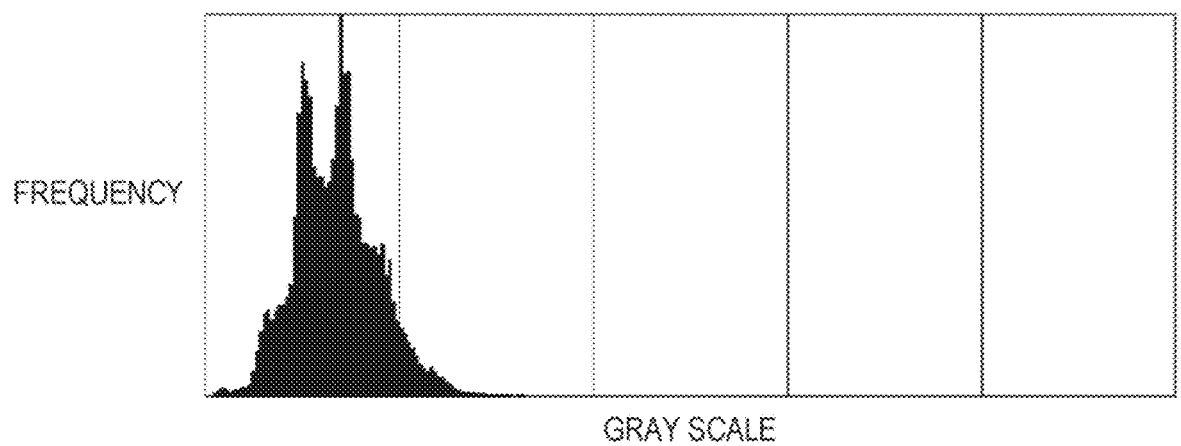
FIG. 18A is a diagram showing a histogram of the slice image in FIG. 17A.
Figure 18B:
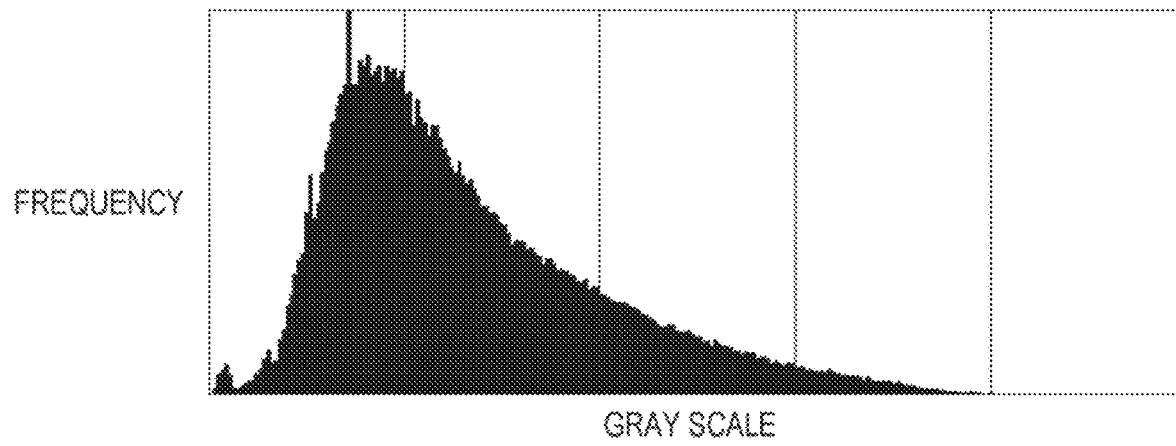
FIG. 18B is a diagram showing a histogram of the slice image in FIG. 17B.

FIG. 18A is a diagram showing a histogram of the slice image in FIG. 17A, and FIG. 18B is a diagram showing a histogram of the slice image in FIG. 17B. In each histogram, a horizontal axis represents a pixel value (gray scale value), and a vertical axis represents a frequency (occurrence frequency). As shown in FIG. 18A, the histogram of the reflective light from the target object on the far side is one in which a size and a reflectance of the target object are reflected, and as a result, a steep edge or a plurality of peaks are present, and the histogram deviates from a normal distribution. On the other hand, as shown in FIG. 18B, in the slice image obtained for the widely determined range RNGw, the object on the far side is hidden by the fog, the rain, or the snow on the near side, so that the histogram of the slice image approaches a histogram of an image including random noise. As a result, the histogram has a single peak, and a shoulder is gentle.

Thus, in the bad weather, a histogram of the slice image IMGf obtained for the predetermined range RNGf tends to approach the histogram shown in FIG. 18B. In contrast, in good weather in which fog, rain, or snow is not present, the histogram of the slice image IMGf approaches the histogram in FIG. 18B. Therefore, the arithmetic processing device 28G can determine whether the weather is good or bad by acquiring the histogram of the slice image IMGf.

In the weather detection mode, it is not essential to increase a depth of the predetermined range RNGf, and the same depth as that in the normal imaging mode may be used.

The arithmetic processing device 28G may generate a histogram for the entire slice image IMGf, or may generate a histogram by extracting only a part (predetermined region) of the slice image IMGf.

By determining the predetermined region such that only the fog, the rain, or the snow is included in the bad weather and no object is present in the good weather, detection accuracy can be improved. Specifically, a sky portion may be determined as the predetermined region. In this case, the predetermined region may be disposed at an upper central portion of the image data.

Figure 19A:
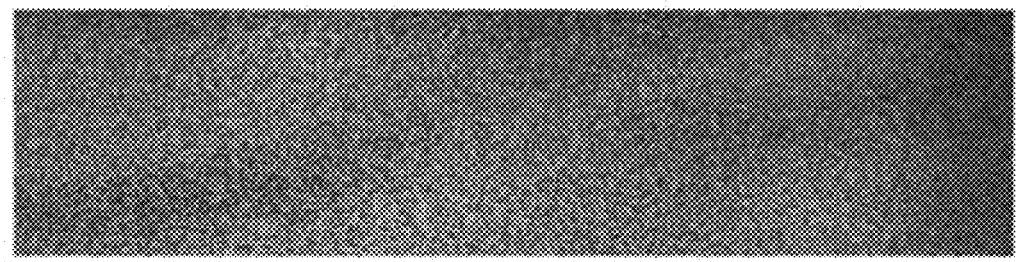
FIG. 19A is image data of an upper space of the slice image in FIG. 17B.
Figure 19B:
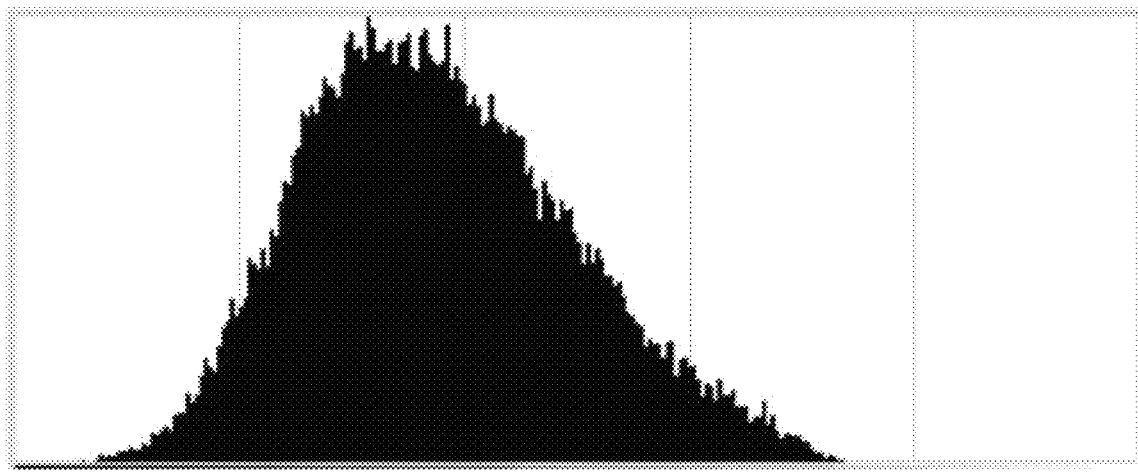
FIG. 19B is a diagram showing a histogram of the image data in FIG. 19A.

FIG. 19A is image data of an upper space of the slice image IMGf in FIG. 17B, and FIG. 19B is a diagram showing a histogram of the image data in FIG. 19A. As described above, when a histogram of a portion corresponding to a sky is generated in the bad weather, the histogram close to the normal distribution is obtained, whereas a distribution of the histogram is concentrated in a low gray scale region since there is no reflection in the good weather.

The arithmetic processing device 28G may generate the histogram of a part (or the whole) of the slice image IMGf, and determine the weather based on features appearing in the histogram in the bad weather. For example, the arithmetic processing device 28G may determine the weather based on a shape of the histogram, and may determine that the weather is bad, for example, when it is determined that the histogram is close to the normal distribution. Whether the histogram is close to the normal distribution may be determined by using a well-known algorithm known as a normality test. Alternatively, in the bad weather, the shoulder of the histogram is gentle as shown in FIG. 18B, so that a variance σ is large. Therefore, when the variance σ exceeds a predetermined threshold value, it may be determined that the weather is bad. Alternatively, it may be determined that the larger the variance σ is, the worse the weather is (the thicker the fog, or the larger the amount of rain or snow is).

Second Example

In the first example, the weather is estimated based on one slice image IMGf obtained for one predetermined range RNGf, but in a second example, imaging is performed for two predetermined ranges RNGfx and RNGfy and the weather is estimated based on two slice images IMGfx and IMGfy obtained for the respective ranges.

Figure 20:
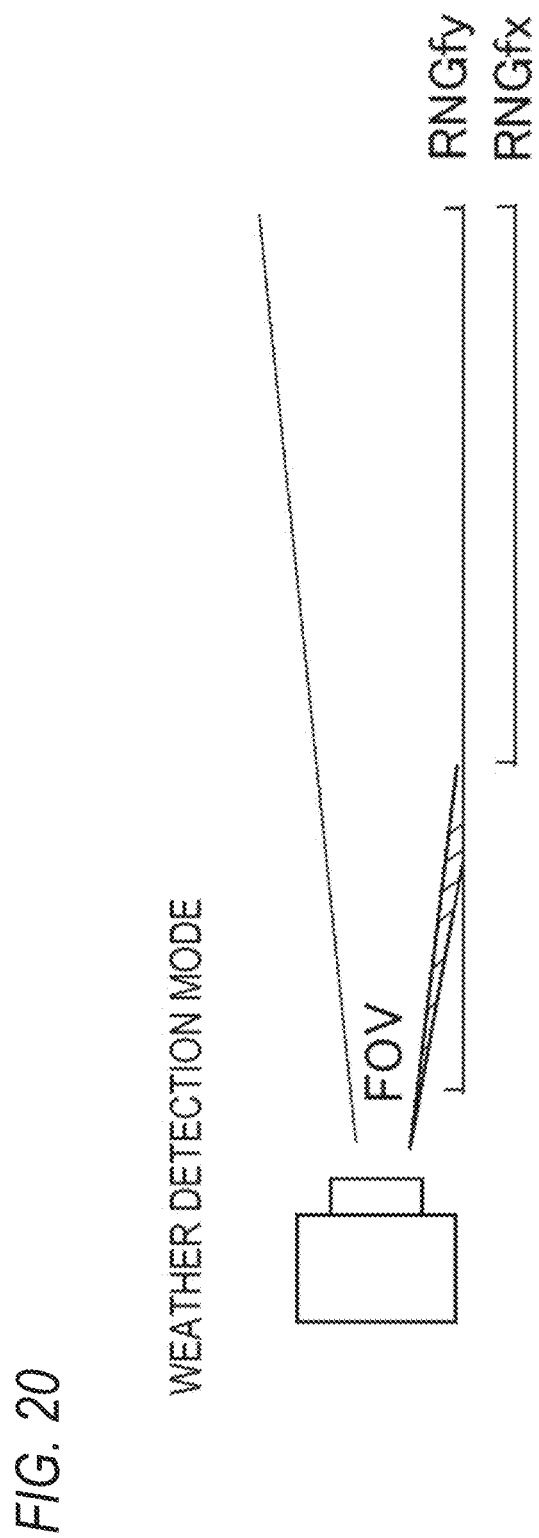
FIG. 20 is a diagram illustrating an imaging range in a weather detection mode.

Specifically, one range (also referred to as a narrow range) RNGfx of the two predetermined ranges is set to be relatively narrow in the depth direction, and the other range (also referred to as a wide range) RNGfy is set to be relatively wide in the depth direction. The wide range RNGfy may be obtained by expanding the narrow range RNGfx to a near side. FIG. 20 is a diagram illustrating an imaging range in the weather detection mode. A broken line represents the field of view of the image sensor 24.

When the gated camera performs imaging on the narrow range RNGfx and the wide range RNGy in the bad weather, the two slice images (a first slice image and a second slice image) as shown in FIGS. 17A and 17B are obtained.

The arithmetic processing device 28G can acquire information on weather based on first image data IMGfx obtained for the narrow range RNGfx and second image data IMGfy obtained for the wide range RNGfy.

Specifically, the arithmetic processing device 28G calculates a histogram of each of the first image data IMGfx and the second image data IMGfy, and acquires the information on weather based on the two histograms. The two histograms correspond to the two histograms shown in FIG. 18A and FIG. 18B.

The histogram obtained for the first image data IMGfx has a shape, a variance, and an average corresponding to a target object included in the narrow range RNGfx. On the other hand, the histogram obtained for the second image data IMGfy approaches the histogram of the first image data IMGfx in the good weather. On the other hand, in the bad weather, the histogram of the second image data IMGfy approaches a histogram of an image including a large amount of random noise. Specifically, in the histogram in the bad weather, features appear that (i) a shape is close to a normal distribution, (ii) a shoulder is gentle, and (iii) a variance is large.

Therefore, the arithmetic processing device 28G may calculate respective averages of the two histograms, and determine that the weather is bad when a difference between the averages exceeds a predetermined threshold value (condition 1).

Alternatively, the arithmetic processing device 28G may calculate respective variances σ of the two histograms, and determine that the weather is bad when a difference between the variances exceeds a predetermined threshold value (condition 2).

The arithmetic processing device 28G may determine that the weather is bad when both of the conditions 1 and 2 are true, or may determine that the weather is bad when any one of the conditions 1 and 2 is true.

The arithmetic processing device 28G may determine whether respective shapes of the two histograms are similar to each other, and may determine that the weather is bad when the shapes are not similar to each other.

Third Example

In a third example, similarly to the second example, the slice images IMGfx and IMGfy are generated for the narrow range RNGfx and the wide range RNGfy, and information on weather is acquired based on the two slice images IMGfx and IMGfy. More specifically, the arithmetic processing device 28G generates a difference image IMGd indicating a difference between the first image data IMGfx and the second image data IMGfy, and acquires the information on weather based on the difference image IMGd.

Figure 21A:
FIG. 21A to FIG. 21C are diagrams illustrating generation of a difference image in the third example.
Figure 21B:
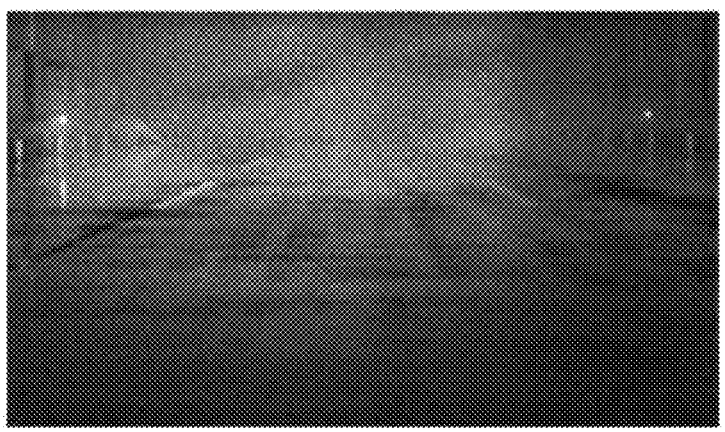
Figure 21C:

FIG. 21A to FIG. 21C are diagrams illustrating generation of a difference image in the third example. A pixel value IMGd(i) of each of pixels of the difference image IMGd is a difference between pixel values IMGfx(i) and IMGfy(i) of corresponding pixels of the first image data IMGfx and the second image data IMGfy.

$$IMGd(i)=IMGfy(i)-IMGfx(i)$$

IMG #(i) indicates a pixel value of an i-th pixel of an image IMG #. In the difference image, most of reflective light from an object located on a far side is cancelled, and many noise components (fog, rain or snow) in a region close to the camera are included.

The arithmetic processing device 28G may estimate the weather based on the whole difference image IMGd, or may estimate the weather based on a part of the difference image IMGd. As shown in FIG. 20, the object present in the range RNGfx on the far side is not imaged in a part of a hatched field-of-view angle in a field of view FOV of the camera. Therefore, the arithmetic processing device 28G may exclude a portion corresponding to the hatched field-of-view angle in the second image data IMGfy, and estimate the weather based on a remaining portion (effective region). The effective region can also be grasped as a range in which an object present in the narrow range RMGfx is imaged.

Figure 22A:
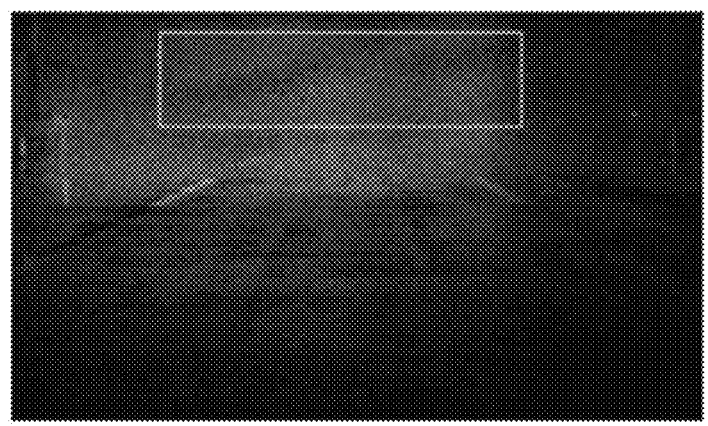
FIG. 22A and FIG. 22B are diagrams illustrating weather estimation based on the difference image.
Figure 22B:
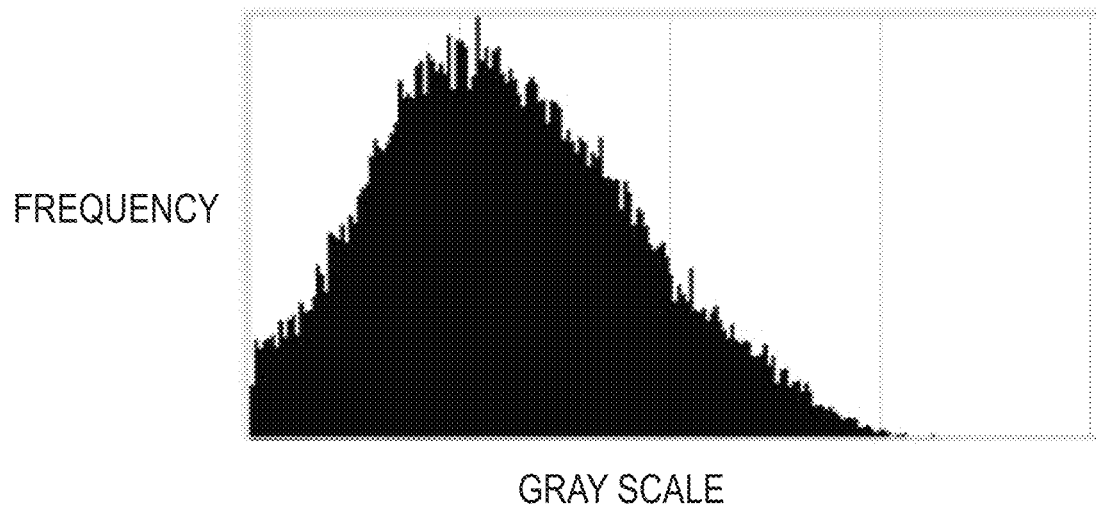

FIGS. 22A and 22B are diagrams illustrating weather estimation based on the difference image IMGd. In the difference image IMGd in FIG. 22A, a rectangular region is shown. The rectangular region is provided in the effective region described above. FIG. 22B shows a histogram in the rectangular region in FIG. 22A. The arithmetic processing device 28G acquires information on weather based on the histogram.

The arithmetic processing device 28G can estimate the weather based on the histogram in the same manner as that described in the first example. Specifically, based on a shape of the histogram, the number of peaks, an inclination of a shoulder, a variance, and the like, it is determined whether the histogram is caused by noise or caused by an object.

The weather estimation described in the seventh embodiment can be used for the control of the imaging mode and the switching between turning on and turning off of the gated camera 20 in combination with techniques in the first to sixth embodiments, but is not limited thereto.

A weather estimation method is not limited to the method described in the seventh embodiment. For example, the weather may be estimated using a phenomenon that a transmittance of infrared rays decreases in the bad weather (fog or rain). In the method, imaging is performed on the predetermined range by the gated camera. An amount of light emitted by the gated camera is known, and a distance to the predetermined range is known. When a reflectance of an object is constant, a pixel value of the object changes according to a transmittance between the gated camera and the object, in other words, a surrounding environment (weather). That is, if the weather is good, the pixel value is relatively large, and if the weather is bad, the pixel value is relatively small. Therefore, the transmittance of light and thus the surrounding environment can be estimated based on the pixel value of the slice image.

For example, the surrounding environment may be estimated based on a pixel value of a specific object having a predetermined reflectance and included in the slice image. The specific object may include at least one of a sign, a road surface, a white line, a guardrail, and a reflection plate whose reflectance is known.

The embodiments are intended to be illustrative only, and it will be obvious to those skilled in the art that various modifications can be made by combining components and processes in the embodiments and that such modifications are also within the scope of the present invention. Hereinafter, such modifications will be described.

First Modification

In the embodiment, the slice image IMG is output from the gated camera 20 to the main controller 60, but the present invention is not limited thereto. For example, an identifier (classifier) may be mounted in the arithmetic processing device 28 of the gated camera 20, and an identification result, that is, a type (category) and a position of a target object may be output to the main controller 60.

Second Modification

In the embodiment, the output from the gated camera 20 is used for the control of the driving assistance or the autonomous driving, but the present invention is not limited thereto. For example, the gated camera 20 may be activated in the bad weather and the slice image IMG generated by the gated camera 20 may be displayed on a display device such as a head up display (HUD) to assist visibility of a user.

Third Modification

In the embodiment, a case where switching between the two imaging modes is performed has been described, but the number of switchable imaging modes may be three or more.

Fourth Modification

In the above description, the gated camera 20 is set to be in the enable state and operates only when necessary, and the imaging mode is switched during the operation, but the present invention is not limited thereto. The gated camera 20 may constantly perform the imaging during traveling, and may then switch the imaging mode.

The embodiments are intended to be illustrative only, and it will be obvious to those skilled in the art that there are various modifications by combining the components and the processes in the embodiments and that such modifications are also included in the scope of the present invention or the present invention.

INDUSTRIAL APPLICABILITY

The present invention can be used in a sensing system for a vehicle.

REFERENCE SIGNS LIST

S1: light emission timing signal
S2: exposure timing signal
10: sensing system
20: gated camera
22: illumination device
24: image sensor
26: camera controller
28: arithmetic processing device
50: main sensor group
52: camera
54: millimeter wave radar
60: main controller
200: vehicle lamp
202: low beam unit
204: high beam unit
210: lamp ECU
300: automobile
302: headlamp
310: vehicle side ECU

The invention claimed is:

1. A gated camera for dividing a field of view into a plurality of ranges in a depth direction and generating a plurality of slice images corresponding to the plurality of ranges, the gated camera comprising:
    an illumination device configured to irradiate the field of view with pulse illumination light;
    an image sensor; and
    a camera controller configured to control a light emission timing of the illumination device and an exposure timing of the image sensor,
    wherein the camera controller is configured to switch between a first imaging mode in which performance is relatively high and power consumption is relatively high, and a second imaging mode in which performance is relatively low and power consumption is relatively low;
    wherein the first imaging mode and the second imaging mode are different from each other in a frame rate.

2. The gated camera according to claim 1,
    wherein the first imaging mode and the second imaging mode are different from each other in a number of ranges to be measured.

3. The gated camera according to claim 1,
    wherein the first imaging mode and the second imaging mode are different from each other in distance to a far side boundary of a farthest range.

4. The gated camera according to claim 3,
    wherein the first imaging mode and the second imaging mode are different from each other in intensity of the pulse illumination light.

5. The gated camera according to claim 1,
    wherein the gated camera is configured to, in response to an instruction from a main controller, immediately switch to a standby mode in which imaging is executable.

6. The gated camera according to claim 1,
    wherein the camera controller is configured to select an imaging mode based on at least one vehicle signal.

7. The gated camera according to claim 1,
    wherein the camera controller is configured to select an imaging mode based on the slice images.

8. The gated camera according to claim 1,
    wherein an imaging mode of the camera controller is selected by a main controller or selected according to a state of the main controller.

* * * * *